(12) United States Patent
Malach

(10) Patent No.: US 6,482,332 B1
(45) Date of Patent: Nov. 19, 2002

(54) PHASE CHANGE FORMULATION

(76) Inventor: Ted J. Malach, 105 Appleglen Pl. SE., Calgary (CA), T2A 7T4

( * ) Notice: Subject to any disclaimer, the term of this patent is extended or adjusted under 35 U.S.C. 154(b) by 0 days.

(21) Appl. No.: 09/523,570

(22) Filed: Mar. 10, 2000

Related U.S. Application Data

(60) Provisional application No. 60/124,049, filed on Mar. 12, 1999.

(51) Int. Cl.[7] .................................................. C09K 5/00
(52) U.S. Cl. .............................. 252/70; 252/71; 252/73; 252/74; 165/10; 165/104.19; 165/104.21
(58) Field of Search .............................. 252/70, 71, 73, 252/74; 165/104.19, 10, 104.21

(56) References Cited

U.S. PATENT DOCUMENTS

| | | | | |
|---|---|---|---|---|
| 2,936,741 A | * | 5/1960 | Telkes ......................... 122/32 |
| 4,403,645 A | * | 9/1983 | MacCracken ................. 165/10 |
| 4,470,264 A | | 9/1984 | Morris .......................... 62/60 |
| 4,596,250 A | * | 6/1986 | Beisang, III et al. ........ 607/114 |
| 4,793,402 A | * | 12/1988 | Yano et al. .................... 165/10 |
| 4,931,333 A | | 6/1990 | Henry ........................... 428/76 |
| 4,971,713 A | * | 11/1990 | Ames .......................... 252/70 |
| 5,072,596 A | * | 12/1991 | Gilbertson et al. ........... 62/185 |
| 5,110,502 A | * | 5/1992 | Singh .......................... 252/319 |
| 5,168,724 A | * | 12/1992 | Gilbertson et al. ........... 62/430 |
| 5,402,650 A | * | 4/1995 | Stewart, Jr. .................... 62/71 |
| 5,417,082 A | | 5/1995 | Foster ....................... 62/457.1 |
| 5,478,988 A | * | 12/1995 | Hughes et al. .............. 219/730 |
| 5,647,226 A | | 7/1997 | Scaringe et al. ............ 62/457.2 |
| 5,744,054 A | | 4/1998 | Takei ........................... 252/70 |
| 5,899,088 A | | 5/1999 | Purdum ........................ 62/371 |
| 5,976,400 A | * | 11/1999 | Muffett et al. ................ 252/70 |
| 6,116,042 A | | 9/2000 | Purdum ........................ 62/371 |
| 6,132,455 A | * | 10/2000 | Shang ........................ 607/108 |

FOREIGN PATENT DOCUMENTS

| | | | |
|---|---|---|---|
| DE | 4108369 | * | 9/1992 |
| EP | 285213 | * | 10/1988 |
| JP | 8-151468 | * | 6/1996 |

* cited by examiner

Primary Examiner—Anthony J. Green
(74) Attorney, Agent, or Firm—Christensen O'Connor Johnson Kindness PLLC

(57) ABSTRACT

A thermal packaging system using a single phase change material (PCM) part in liquid and part in solid form to confine the temperature of the product within a predetermined range. The temperature ranges are determined by the selection of PCM formulation. The phase change materials selected have high latent heats of fusion and maintain relatively constant temperatures as they change phase. This permits light weight packaging with the maintenance of temperatures in narrow, preselected ranges over extended periods of time. A phase change formulation that can be adjusted to freeze at temperatures from +40° C. to below −30° C. is disclosed, comprising butanediol, selected percentages of distilled water, and nucleating agents. The phase change occurs over a narrow temperature range making this an ideal temperature control media. Nucleating or other agents are included to narrow the temperature range over which the phase change occurs.

20 Claims, 15 Drawing Sheets

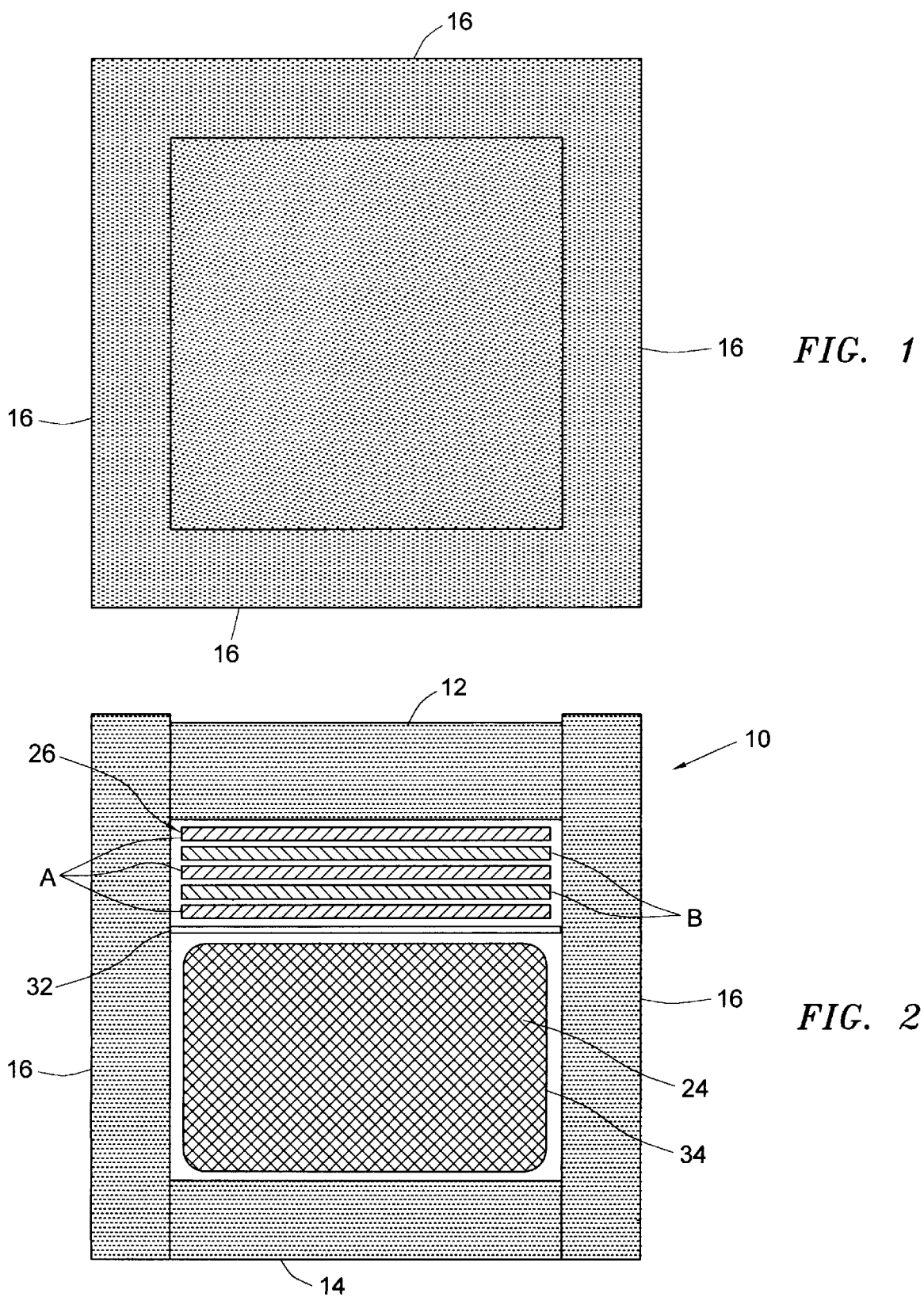

PHASE CHANGE FORMULATION

CROSS-REFERENCE TO RELATED APPLICATIONS

This application claims the benefit of U.S. provisional application Serial No. 60/124,049 filed Mar. 12, 1999.

FIELD OF THE INVENTION

This invention relates to packaging systems, and phase change formulations.

BACKGROUND OF THE INVENTION

In the art of packaging systems, it is known to provide an insulated chamber with a heat sink formed of dry ice on one upper side of the chamber, and a heat source formed of water ice on a lower side of the chamber. Such designs do not provide for precise temperature control over a wide variety of temperature ranges. It is an object of this invention to provide a packaging system with good temperature control over a a wide temperature range.

Glycols are known in the art as being suitable phase change materials for controlling temperature of products. Glycols, however, tend to undercool before freezing due to trace amounts of contaminants, and it is an objective of this invention to overcome problems of undercooling of glycols.

In addition, while providing phase change materials within containers is known, these materials tend to be arranged in a single layer of pockets sandwiched between two sheets. The present invention provides an improvement on such devices.

SUMMARY OF THE INVENTION

According to an aspect of the invention, there is provided a packaging system comprising an insulated container having a chamber for receiving product, product in the chamber, and plural layers of phase change material on at least one side of the product, the layers of phase change material comprising at least one liquid layer and one solid layer.

According to a further aspect of the invention, the layers are formed of the same phase change material.

According to a further aspect of the invention, there are plural layers on one side of the product and at least one layer of phase change material on another side of the product. According to a further aspect of the invention, there is provided plural layers of phase change material above and below the product, including both solid and liquid phase change material above and below the product.

According to a further aspect of the invention, the product is wrapped in a blanket of phase change material. According to a further aspect of the invention, the product is wrapped in a foil.

According to a further aspect of the invention, there insulated chamber comprises an inner wall, an outer wall and phase change material disposed between the inner and outer walls.

According to a further aspect of the invention, there is provided a phase change formulation comprising 1–99.5% by weight polyol, 0.5–99% water, and nucleating agent. The polyol may be a glycol, which may itself be 1,4-butanediol, 1,2-butanediol, 2,3-butanediol or a mixture thereof. The phase change formulation may further comprise glycerol in the range of 0.5 to 15%.

According to a further aspect of the invention, the polyol is a triol, which may be glycerol.

According to a further aspect of the invention, the nucleating agent is selected from the group consisting of talc and an alkaline earth metal salt.

Thickening agent may be added to the phase change formulation, such as kaolin clay or talc.

According to a further aspect of the invention, there is provided a thermal stabilizer, comprising, a fluid, an impermeable envelope that is impermeable to the fluid, the impermeable envelope having an interior, a permeable mat confined within the impermeable envelope, the permeable mat being commensurate in size with the interior of the envelope; and the permeable mat being impregnated with the fluid.

According to a further aspect of the invention, the fluid is a gellable fluid and the permeable mat is impregnated with a gelling agent. The permeable mat may be a fibrous mat. The fluid may be a phase change material. The envelope may have a height, width and length, and the height is less than $\frac{1}{5}$ of the width and less than $\frac{1}{5}$ of the length. The envelope may have a height, width and length, and the height is less than $\frac{1}{5}$ of the width and less than $\frac{1}{10}$ of the length.

According to a further aspect of the invention, there is provided A method of making a thermal stabilizer, comprising the steps of inserting the permeable mat into an envelope; and impregnating the permeable mat with a fluid. The method may further comprise impregnating the permeable mat with a gelling agent, before impregnating the permeable mat with a fluid, the fluid being a gellable fluid. The fluid may be a phase change material.

Further aspects of the invention are set forth in the claims and other aspects of the invention are described in the detailed description. Particularly, several novel phase change formations are disclosed.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIG. 1 shows a top view of a first embodiment of a constant temperature packing arrangement according to the invention;

FIG. 2 shows a side view section through the embodiment of a constant temperature packing arrangement according to the invention of FIG. 1;

DETAILED DESCRIPTION OF PREFERRED EMBODIMENTS

In this patent document, "comprising" means "including". In addition, a reference to an element by the indefinite article "a" does not exclude the possibility that more than one of the element is present.

The packaging system was developed for shipments of goods which must be kept within narrow temperature ranges over a period of days under uncontrolled ambient temperature conditions. Such goods include biological products, blood products, vaccines, pharmaceuticals, chocolate products, latex paints, etc. Examples include whole blood 1 to 10° C., Factor VIII (used by hemophiliacs) 2 to 8° C., diagnostic blood samples 1 to 10° C., some vaccines 2 to 10° C., blood platelets 20 to 24° C., and chocolate approximately 10° C. The system described here can maintain controlled product temperatures under both high and low ambient temperature conditions.

This system uses phase change materials for tight temperature control and minimum shipping weight and volume. For example, the formulation that changes phase at between 15 and 20° C. has a latent heat of fusion of approximately 50 cal/g. Common gel packs and water have specific heats of about 1 cal/g/° C. at that temperature. If this formulation was used to control temperature within a 5° C. range (+15° C. to 20° C.), it would have the equivalent thermal energy of ten times its weight in gel packs.

These phase change materials are reusable, and can save significantly on shipping costs. Particularly, 1,4 butanediol, glycerol, polyethylene glycols (PEGs) and 1,6 hexanediol are inexpensive and widely available.

All of the material compositions of liquids described below are by volume percent, unless otherwise stated. The amount of nucleating agent is also specified as volume percent. The percentages given are the percentage of the total product. In some cases, the totals do not add up to 100% since the amount of nucleating agent is within the error bounds on the measurement of the liquid.

Figure 3:
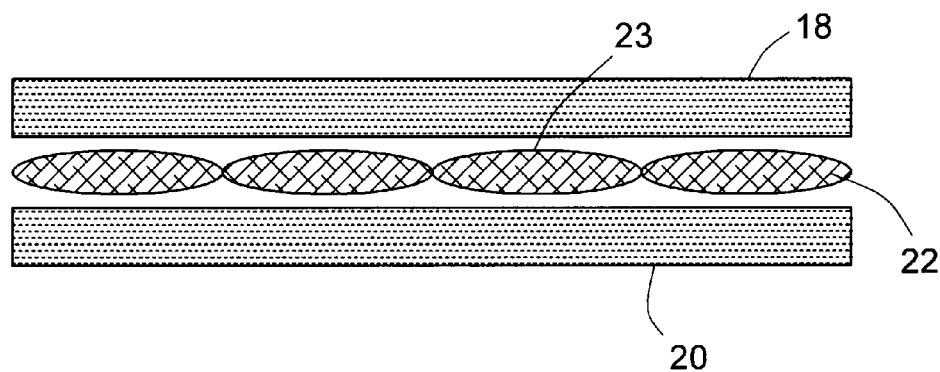
FIG. 3 shows section through a wall of a container according to an aspect of the invention.

FIGS. 1–4 show a packaging system that may be used in conjunction with the phase change materials described here. An insulated outer container 10 includes a top wall 12, bottom wall 14 and identical side walls 16. Each wall 12, 14, 16 may be constructed as shown in FIG. 3 in which an inner wall 18 and outer wall 20 sandwich a layer of phase change material (PCM) 22. In the embodiment of FIG. 3, the walls 16 of the container 10 comprise 3 layers: an outer and inner insulation material layer, between which is a PCM 22 in plastic containers. This embodiment would provide a more even temperature in the product. Until the PCM in the middle layer has all melted or frozen, the temperature would be nearly uniform everywhere at the container's inner surface.

Alternatively, the inner wall 18 and outer wall 20 may sandwich insulation in various forms such as a sheet. The phase change material 22 may be retained in plural pockets 23 arranged in a grid fashion between two sheets of liquid impermeable material. The outer container 10 may be used to contain a variety of shapes and sizes of product 24, and may itself have various shapes. The higher the insulation or R-Factor, the better the performance of the system. The insulated container 10 should completely enclose the product 24 except for the opening for the top wall 12. The top wall 12 preferably has the form of a plug, with a relatively tight and air proof fit with the side walls 16. The top wall 12 may be made from insulating foam or other insulating material, and may take the form of an insulated lid rather than a plug. A lid may be made of insulated walls that fasten together. An insulated blanket may be wrapped around the insulated container instead of a plug or lid. The insulated blanket than becomes the top wall 12.

Figure 4:
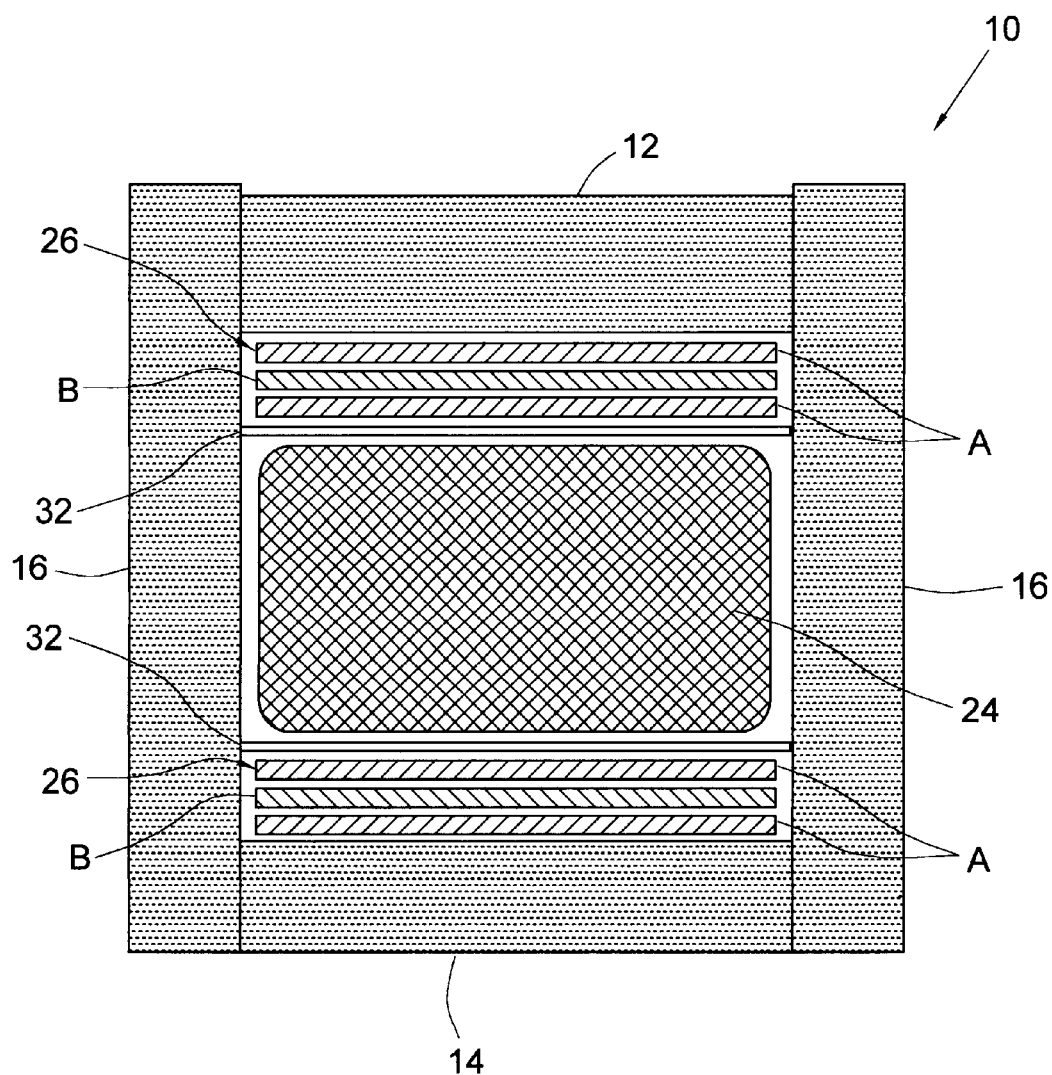
FIG. 4 shows a side view section through a second embodiment of the packaging system of the invention.
Figure 5:
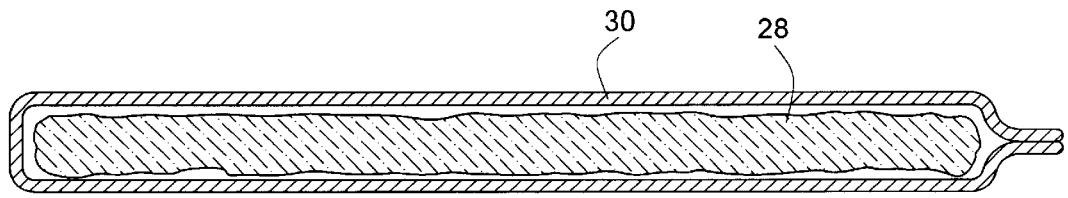
FIG. 5 shows a cross section through an aspect of the invention comprising a laminate style container for phase change material.

Phase change material 26 is provided inside the container 10 in plural layers, on one side of the product 24 as shown in FIG. 2 or on both sides as shown in FIG. 4. Each layer 26 may be made from a grid of pockets, or may be formed of a thin laminate (for example a fiber mat) of inert permeable material 28 impregnated with phase change material and then enclosed within an impermeable envelope 30, as illustrated in FIG. 5. Possible inert permeable materials include air laid materials such as air laid cellulose fibres or any fibrous permeable mat. Inert means that the permeable material does not react with the phase change material to destroy its desirable phase change properties. The envelope 30 is impermeable to the phase change material. By impermeable is not intended absolute impermeability, but sufficient impermeability that the product may be used for practical purposes without leakage. Appropriate materials are well known in the art such as nylon outer with polypropylene inner welded together. Plastics that are inadequately impermeable in themselves may have aluminum facings to enhance impermeability. The envelope 30 has an interior that confines the permeable fiber mat, with the permeable fiber mat being commensurate in size with the interior of the envelope. Preferably, the height of the envelope is less than $\frac{1}{5}$ its width, and the height is less than $\frac{1}{5}$ is length, and even more preferably, less than $\frac{1}{10}$ for each ratio. For example, the envelope should not be more than about $\frac{1}{2}$ inch thick, and the length and width may each be 5 inches or more and need not be equal.

The plural layers 26 or laminate may be formed of a single phase change material, with alternating layers of liquid and solid (eg solid-liquid-solid above and below the product 24 in FIG. 4), to thus maintain a single temperature, or may be made of different phase change materials, each having a different freezing point, to thus maintain the product within a range of temperature bounded by the freezing points of the two phase change materials. Thus, the layers 26 in FIGS. 2 and 4 may be arranged with phase change material A, then phase change material B on top, and then another layer of phase change material A. Multiple layers may be used, for example 2–10 layers. The layers 26 are preferably slab shaped, in that they should be thin in relation to their width and length, as for example the depth or thickness being at least less than $\frac{1}{5}$ of both the width and length. A divider 32 may be used to separate product 24 from phase change material. Dividers 32 reduce product temperature gradients if they are constructed of a thermally conductive material such as light gauge aluminum sheets. Plastic dividers covered with aluminum foil on one or both sides may also be used. They also can serve as a mechanical protective barrier for the product.

In the case of use of the same phase change material in all layers 26, the phase change material 26 whether liquid or solid is set close to the freezing point, and is placed in the container in a ratio of solid to liquid that is determined by whether protection against cold is required or protection against heat is required. Various numbers of layers of phase change material 26 may be used based upon time requirements, ambient temperature requirements, thermal insulation factor of the outer container, and the degree of temperature control required for the product. The precision of the preconditioning temperature is not so critical when the solid and liquid phase packages are placed together they will automatically stabilize within the phase transition temperature range. The stabilization temperature will depend mostly upon the amount of solid and liquid phase change material, as the latent heats of fusion or melting are much larger than the specific heats.

The product 24 may be wrapped in thermally conductive material 34 (eg. thermally conductive metal foil such as aluminum foil) to further reduce thermal gradients. Household grade of aluminum foil may be used, in which the thickness in the order of a few thousandths of an inch thick. As an alternate, a product enclosure constructed of thermally conductive material may be used. It should be noted that although aluminum foil may not seem like such a good thermal conductor, in an insulated container it is comparatively a very good conductor.

Figure 6:
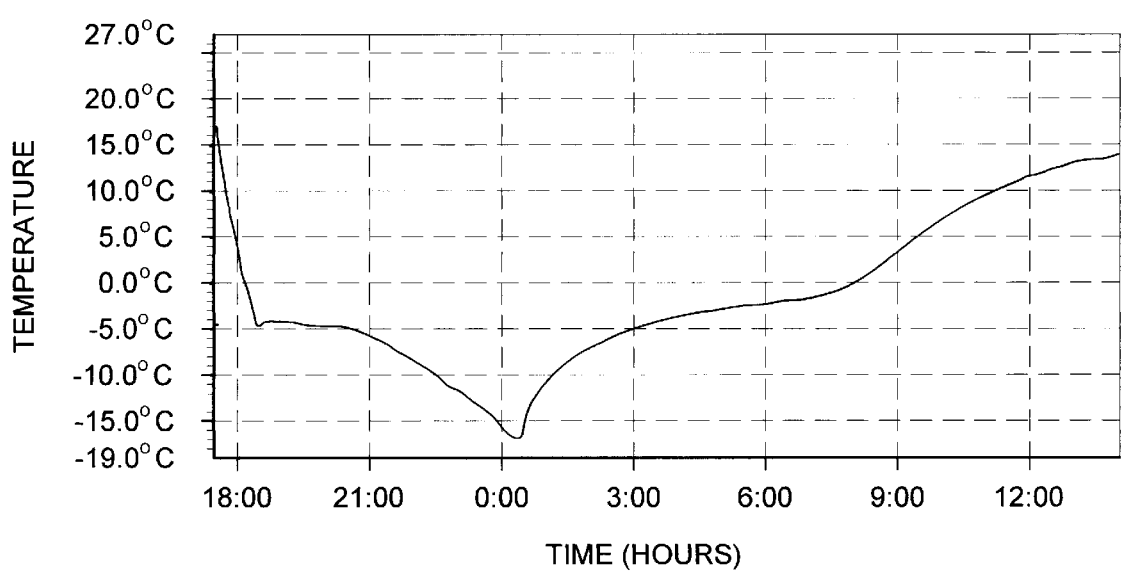
FIG. 6 is a graph showing freeze and thaw characteristic of a glycerol (10%)/water (90%)/talc (0.05%) formulation according to the invention.

With packages of solid PCM, 26 liquid PCM 26 and product 24 in place, the product chamber will be at a temperature between those given by the melting temperature curve and the freezing temperature curve for the PCM formulation selected. An exemplary curve is shown in FIG. 6 for a mixture of glycerol 10%, water 90% and talc 0.05%, wherein the mixture freezes at about $-5°$ C. and melts at about $-2°$ C. The PCM's will provide resistance to temperature swings above and below the temperature boundaries as defined by the melting and freezing curves mentioned above. This will effectively lock the temperature into a pre-selected range. The use of dividers (optional) that are relatively conductive to heat will reduce thermal gradients within the product chamber. Wrapping the product in thermally conductive material (eg. aluminum foil) or having a thermally conductive product chamber will further reduce product temperature gradients. The product chamber temperature set point is determined by the PCM formulation selected.

The PCM in liquid and solid phase as described above effectively acts as a PCM at an intermediate stage of phase change. By varying the ratio of solid phase PCM containers to liquid phase containers, protection can be tailored to ambient temperatures mostly above or below the required product temperature range. For example, if a product is required to be kept within a range of +2 to +8° C., and it is being shipped in ambient conditions of +30° C., more solid than liquid phase PCM could be employed. By the nature of this system, it still will provide protection against $-20°$ C. but not for as long as against higher ambient temperatures. This can be important when shipping in aircraft with unheated cargo areas.

Two PCMs can be used to more closely customize the temperature range and other properties of the shipment. For example, for food product to be kept anywhere between 0° C. and 17° C., liquid PCM that freezes at 2° C. and solid PCM that freezes at 15° C. could be used. Two PCMs could also be combined so as to achieve required temperature protection with minimum PCM. For example water ice and Blue PCM can be used to keep a product between 2 and 8° C. Blue PCM comprises 94.7% butanediol, 5.3% water and about 0.01% talc, and freezes at about 5° C. It is discussed in greater detail below. The water ice has a high heat capacity and therefore less of it is needed to keep the product below 8° C. However the PCM is needed as water alone will freeze near 0° C. and the product would therefore have insufficient protection against low temperature.

PCMs with high freezing temperatures have the advantage of being rechargeable in commonly encountered ambient temperatures. For example, Red PCM freezes at about 16° C. If it is used as solid PCM in a shipment to protect against both high and low ambient temperatures, it will freeze again when the ambient temperature drops below 16° C., after which the shipping package will have the same capacity for protecting against high temperatures that it had at the start of shipping. Red PCM is discussed in detail below.

Test results have demonstrated that this system can maintain tight temperature ranges over a period of days under adverse ambient temperature conditions.

This system can meet many of the most demanding temperature control requirements of biologics and pharmaceutical shippers. Protection against high and low temperatures is provided simultaneously. Shipments will not have to be delayed due to unfavorable ambient temperature conditions. Shipments will not have to be met at intermediate destinations to "recharge" the temperature regulating media. The system is economical to operate, all parts are reusable. The inherent lighter weight of this system will pay for itself many times over in reduced shipping costs. The biggest payback results from the reduction in spoiled shipments of expensive product. This packaging system provides additional mechanical protection to product as both the dividers and the phase change material packages provide cushioning. An exemplary preferred phase change material is a butanediol formulation disclosed below which is non-toxic and non-irritating. Butanediol has been accepted by a government regulatory body for use with blood products. (Butanediol has been used in its pure form, frozen state, to control the temperature of blood and platelets).

The phase change material may be placed in blankets made up of pouches of phase change material. The blankets may also be thin, flat sheets using permeable mats 28, encased in plastic wrapping as illustrated in FIG. 5 The permeable mats 28 may be cellulose fibre or other absorbent material that does not deleteriously react with the PCM. The permeable material 28 preferably absorbs and holds the PCM in place, minimizing leakage in the event of a puncture as well as providing dimensional stability. As many of the PCMs disclosed here are still pliable when frozen, these sheets may be bent to conform to product when shipping. Such fibrous sheet blankets have less dead air space in packing, compared to a pouches-style blanket. Less dead air space makes packaging less voluminous and makes it more thermally efficient by reducing thermal leakage. Fibrous sheet blankets may be made thinner than a pouches-style blanket, and so provide quicker thermal equilibrium when frozen and liquid sheets are interleaved. There would also be more contact area between PCM sheets, and between PCM sheets and product, providing better temperature control.

Blankets of PCM may be used to enclose entire pallets of product. The blankets may be layered as shown in FIGS. 2 and 4, with alternate solid and liquid phase material used to protect product from both hot and cold conditions. The blankets may be in alternating layers on one, two or all sides of the product. The combination of liquid and solid forms a composite having properties similar to a slush and effectively provide a mechanism of thermal bracketing. This thermal bracketing is analogous to ice—water combinations used to maintain temperatures of 0° C., except that with this phase change material the temperature is selectable. The pallet must utilize an insulated container and the product preferably preconditioned to the appropriate temperature. If hot ambient temperatures are the major concern, more solid than liquid layers are employed and vice versa. The product may be placed inside a thermally conductive container or wrapped in a conductive metal foil.

For larger packages such as pallets, the blankets of PCM may cover the top, bottom, and all sides of the product. The present invention has many applications. It can be used to maintain temperatures above the freezing point of water in pre-selected narrow ranges between 0 to +17° C. for the preservation of biological material, pharmaceuticals, and other temperature sensitive materials that must be kept above freezing. Cold compresses, for example, at +8° C. may be more comfortable and therapeutically efficient than ice packs at 0° C. The latent heat of fusion from the phase change at this temperature will maintain this temperature significantly longer than water based gel packs.

The preferred chemical families used for PCMs are polyols such as glycols, including polyethylene glycols, diols and triols, and mixtures thereof, usually with water, that have a phase change from liquid to solid within a desirable working range, for example −30° C. to 40° C., although for many applications, a range of −10° C. to 20° C. is adequate. A mixture of polyols, with or without water, may be treated to avoid undercooling by addition of nucleating agent. The basic chemical formula for glycols is $(CH_2)_n(OH)_2$, triols have one more (OH) group. The combination of glycols with water results in a mixture with a different melting point than the original glycol. The same can be done with any combination of glycols, triols, and water. Some exemplary useful polyols are listed below:

(a) Propanediol isomers. The 1,3-propanediol isomer has a melting point of approximately −27° C.

(b) Butanediol isomers. The 1,4-butanediol isomer has a melting point of approximately +20° C.

(c) Pentanediol isomers. The 1,5 pentanediol isomer has a melting point of approximately −16° C.

(d) Hexanediol isomers. The 1,6 hexanediol isomer has a melting point of approximately +41° C.

(e) Polyethylene glycols. These are categorized by molecular weight.
Polyethylene glycol (PEG) 200 freezing point −65°
PEG 300 freezing point −8 to −15° C.
PEG 400 freezing point +4 to 8° C.
PEG 600 melting point +20 to 25° C.
PEG 1500 melting point +44 to 48° C.
PEG 4000 melting point +54 to 58° C.
PEG 6000 melting point +56 to 63° C.

(f) 1,2,3, Propanetriol (glycerin)

In general, the smaller the molecule, the higher the potential latent heat of fusion. One of the highest known solid/liquid transition latent heats is ice/water at 80 cal/g.

By combining water with glycols (diols), the freezing point of the resultant mixture is altered from that of the pure glycol, depending on the ratio of water to glycol. With the selection of different glycols and different water ratios, many different phase change temperatures and characteristics are possible.

There are many applications for PMC's that melt at a temperature below 0° C. Even for materials that should be maintained at 0° C, water ice is not suitable, as it typically melts at about 0.5° C. Many biological and other materials begin to thaw at temperatures several degrees below that of water ice.

Figure 7:
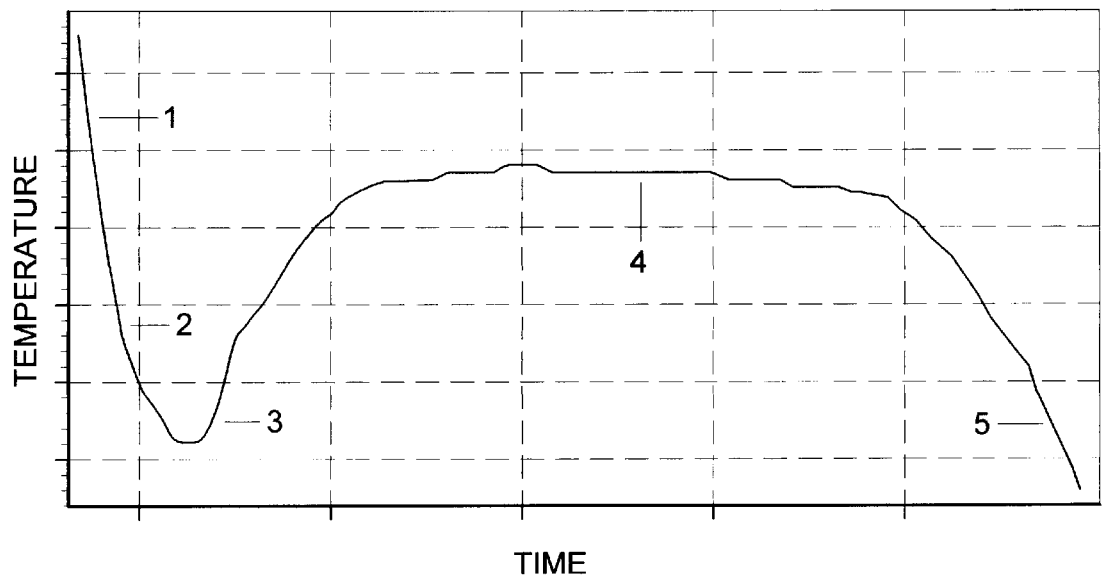
FIG. 7 is a graph showing freeze characteristic of butanediol/water formulation.
Figure 8:
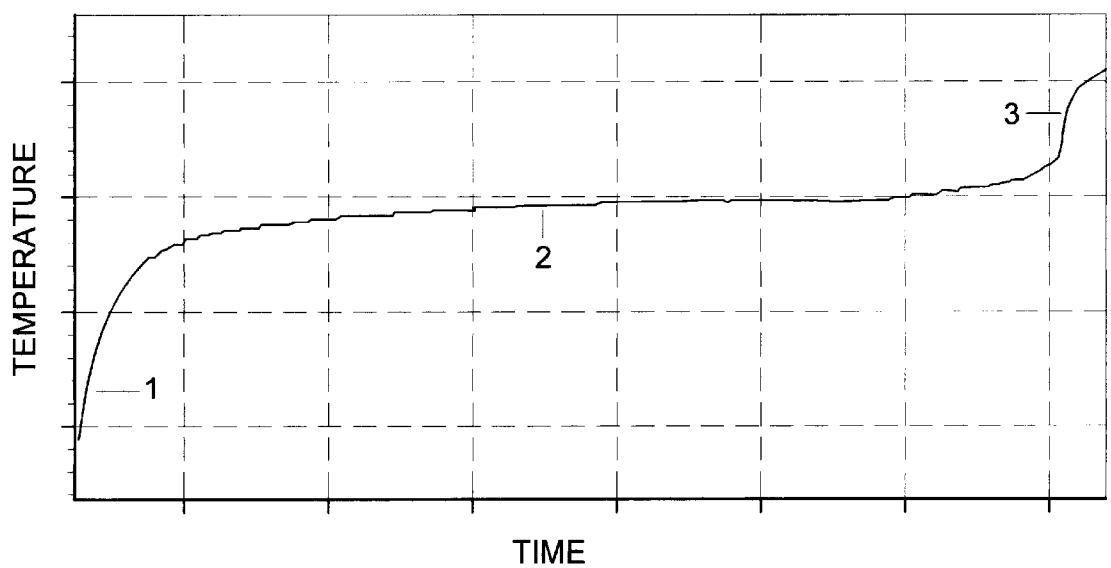
FIG. 8 is a graph showing melt characteristic of butanediol/water formulation.

A nucleating agent is added to a PCM to reduce or eliminate super cooling. Most PCM's super cool by dropping below the freezing point for some time while still a liquid, before solid phase begins to form. An example is shown in FIG. 7 which shows freezing of a butanediol and water formulation. The melt curve is shown in FIG. 8 for the same material. Super cooling would therefore be undesireable in a system used to keep the product near the PCM freezing temperature. Supercooling can also cause unnecessarily long times to freeze PCM in preparation for use. Nucleating agents include talc, and alkaline earth metal salts such as barium sulfate. It is preferred that the nucleating agent be insoluble in the phase change material.

Figure 9:
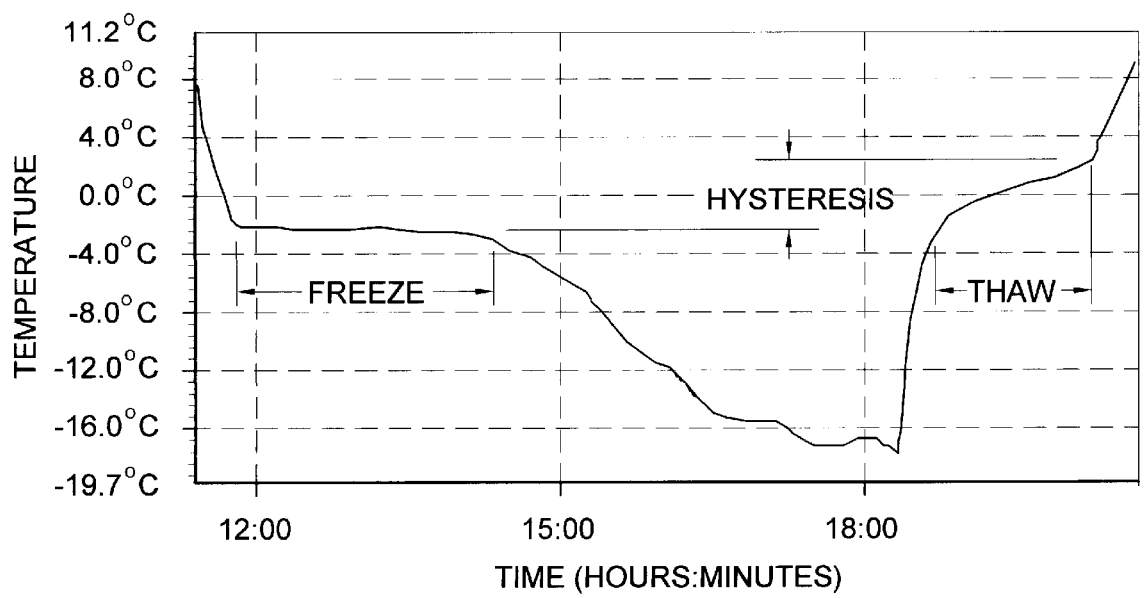
FIG. 9 is a graph showing an example of freeze and thaw hysteresis.

PCMs typically exhibit hysteresis. That is their cooling temperature range is different lower than their thawing temperature range, as illustrated in FIG. 9.

Thickening agents can also be added. The PCM can so be made more viscous in the liquid state. For some PCMs, the solid state can be made more plastic. Thickening agents include talc and Kaolin clays.

A preferred PCM comprises 1–99.5% by weight butanediol, 0.5–99% water, and nucleating agent(s). The butanediol may be 1,4-butanediol, 1,2-butanediol, 2,3- butanediol or a mixture thereof. Glycerol may be used as the PCM alone in combination with water and nucleating agent, or may be added to a diol, for example glycerol may be added to butanediol in any amount, for example 20% glycerol, 80% water and talc, which changes phase between −6° C. and −14° C., which is particularly useful for keeping foods frozen. Preferred nucleating agents are talc and salts of alkaline earth metals such as barium sulphate, which may be present in an amount of 0.001% to 20%. Thickening agents may be added to the mixture. The thickening agents claimed are preferably talc and/or kaolin clays. The 1,4-butanediol isomer has a latent heat of fusion in the range of 50 cal/g. This is relatively high with respect to most phase change materials. Addition of talc beyond about 0.05% does not improve results significantly, while adding even trace amounts, such as 0.001% has an effect on reducing supercooling.

Gelling agents such as cellulose gelling agents, as for example hydroxyethyl cellulose, ethyl cellulose and methyl cellulose, as well as super absorbent polymers, may be added to the phase change formulation in amounts that depend upon the formulation to be gelled, but,ay be in amounts of 0.5% or more. Gelling agent may be embedded in the mat Down in FIG. 5 prior to addition of the phase change formulation. The combination of envelope, mat and gelling agent may also be used to provide a leak resistant structure for any gellable fluid, to thus form a thin gel pack. The mat may be inserted in the envelope and then the phase change material drawn in by a vacuum process.

Significant advantages apart from thermal characteristics of this formula include: nontoxic, non-irritating. Butanediol in its pure form is accepted for use with blood products by regulatory bodies. It will not harm the ink on blood product labels. Spills can be cleaned with water FIG. 7 illustrates the thermal freezing characteristics of a phase change formulation. This graph represents the temperature of the phase change material as it undergoes freezing. The shape of this curve is similar for different formulations except that the whole curve is moved up or down depending on the mixture ratios.

The following is a description of the freezing process referring to the numbers on the graph:

1. This is the initial cooling slope of the phase change material while it is in liquid form and before any before any phase change takes place. This rate of cooling is similar to the rate at which an ordinary gel pack would cool. With a gel pack, this cooling would continue with this same exponential downward slope to the ambient temperature.
2. At this point super cooling of the phase change material is occurring. The addition of nucleating agents reduces this effect as illustrated in FIG. 6 for the example of glycerol, water and talc. The amount of super cooling observed in various tests has been in the range of 10° C. in the formulation freezing at 6° C. without the use of nucleating agents. This would not provide freeze protection for product that must be kept above 0° C. Talc reduces the super cooling of this formula to approximately 3° C., making it an effective formulation.
3. At this point, crystallization is beginning to occur and heat energy is being released.
4. This plateau is the freezing temperature of the phase change material. Note the long extended plateau, making this a good temperature stabilizing agent. Depending on the mixture selected, this plateau may occur anywhere from +40° C. to below −30° C.
5. The phase change material is essentially solidified at this point and its temperature stabilizing ability has reverted to within the range of an ordinary gel pack FIG. 8 represents the thermal melting characteristics of a phase change formulation without nucleating agent. The shape of this curve is similar for different formulations except that the whole curve is moved up or down depending on the mixture ratios.

1. The temperature of the frozen phase change material rises in response to the ambient temperature.
2. The phase change material is undergoing melting and absorbing thermal energy in accordance with its latent heat of fusion. Note the stable thermal plateau. This plateau has been observed to be several degrees Celsius higher than that of the freezing plateau for the same mixture. This phenomenon is known as hysteresis.
3. At this point the phase change material is in liquid state.

The addition of glycerol to the formulation slightly modifies the shape of the freezing curve and can also used with butanediol to produce useful variable temperature PCM's. This can provide benefits when used with thickening agents to provide a softer material when in the solid (frozen) state.

The 1,4-butanediol, distilled water, glycerol and talc do not chemically react with each other and are not hazardous.

Another PCM, referred to as Red PCM, comprises butanediol with a talc nucleating agent. Typical talc concentration is 0.01 to 0.05%, but lower concentrations will also provide for nucleation. Red PCM has potential applications for maintaining product in a temperature range of 14 to 20° C. Cosmetics, pharmaceuticals, biologicals and many consumer items fall within this category.

Figure 10:
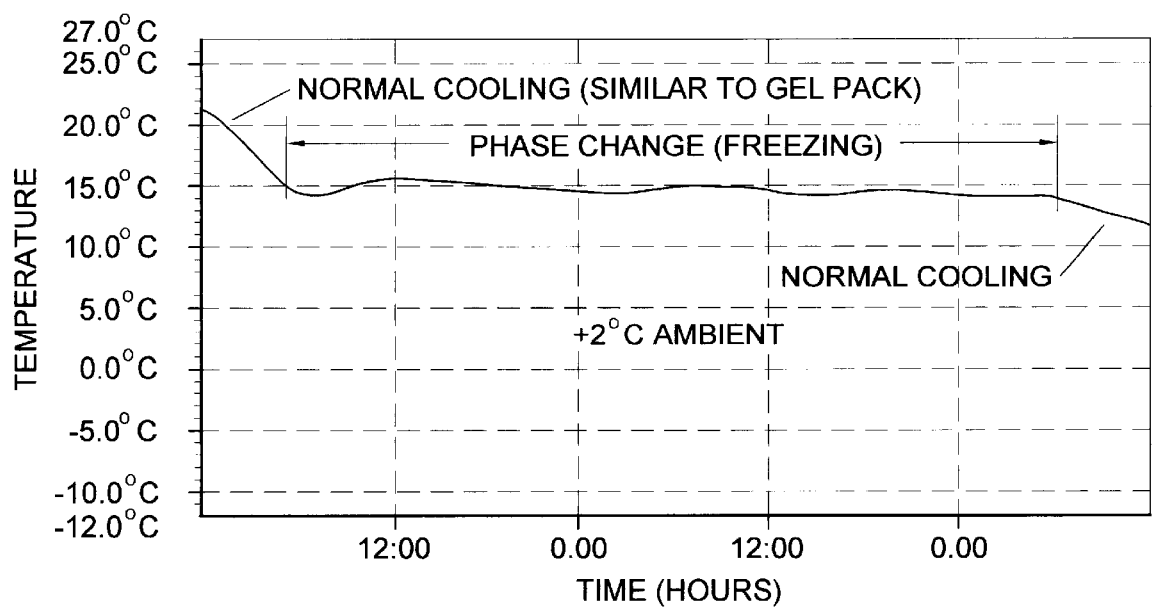
FIG. 10 is a graph showing cooling and freeze characteristic of Red PCM, which comprises 1,4 butanediol with a talc nucleating agent, a formulation according to the invention.
Figure 11:
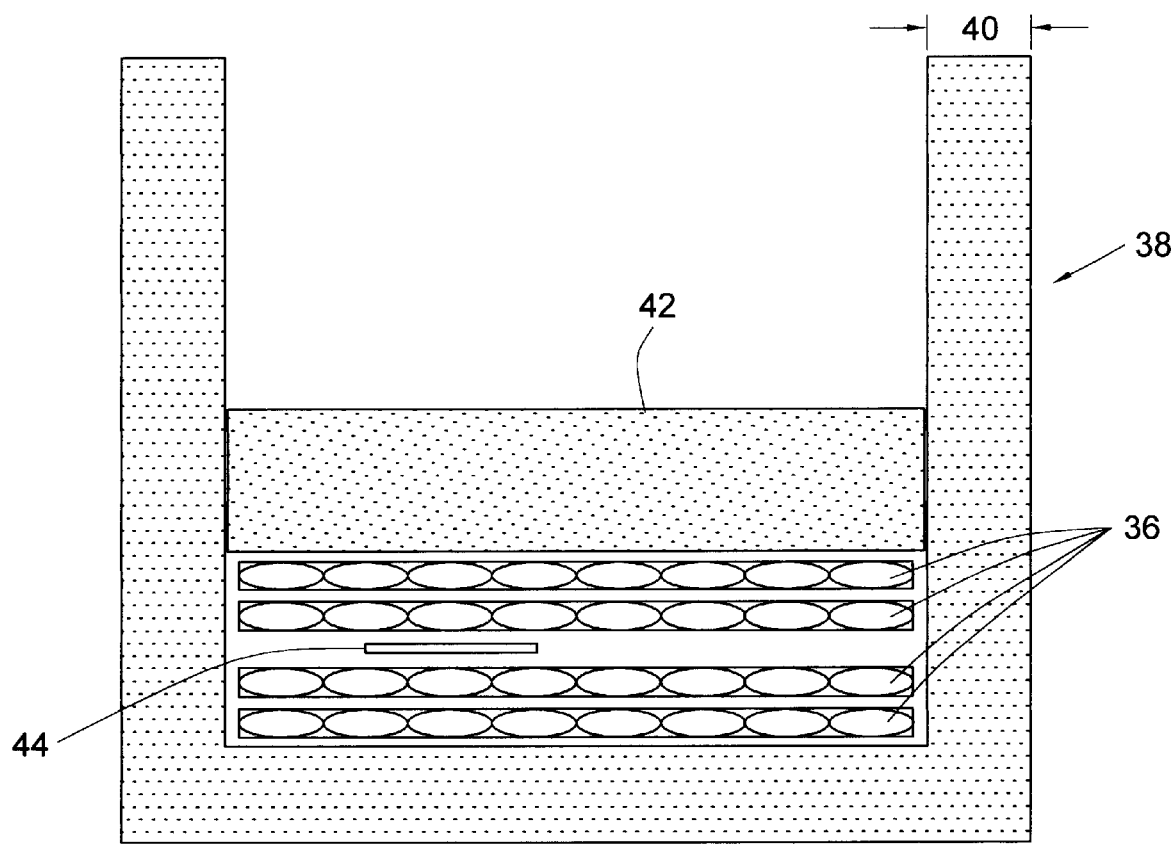
FIG. 11 is a side view cross section of an insulating box and configuration used to test phase change material cooling and warming.

FIG. 10 illustrates the characteristic of Red PCM as it changes from liquid to solid form. This characteristic simulates the performance of Red PCM in maintaining a +14° C. to +20° C. temperature range with a low ambient temperature, analogous to ground shipping a sample in winter conditions. FIG. 10 shows the Red PCM changing phase at about +16° C. with no supercooling. A temperature probe 44 was installed in 1.0 Kg of Red liquid form PCM (packaged in a sheet of 'blisters' each containing approximately 12 grams of Red PCM) 36 and placed inside an ISC Inc. E-28 box 38, as shown in FIG. 11. ISC Inc. is a company of Phoenix, Arizona. The E-28 box 38 has a wall 40 thickness of 1.5" urethane insulation, net interior dimensions of 6.75"×9.25"×7" high, and uses a 3" thick foam plug as a cover 42. The contents were installed in the box at room temperature prior to cooling. This box was then placed inside a refrigerator at +2° C.

Figure 12:
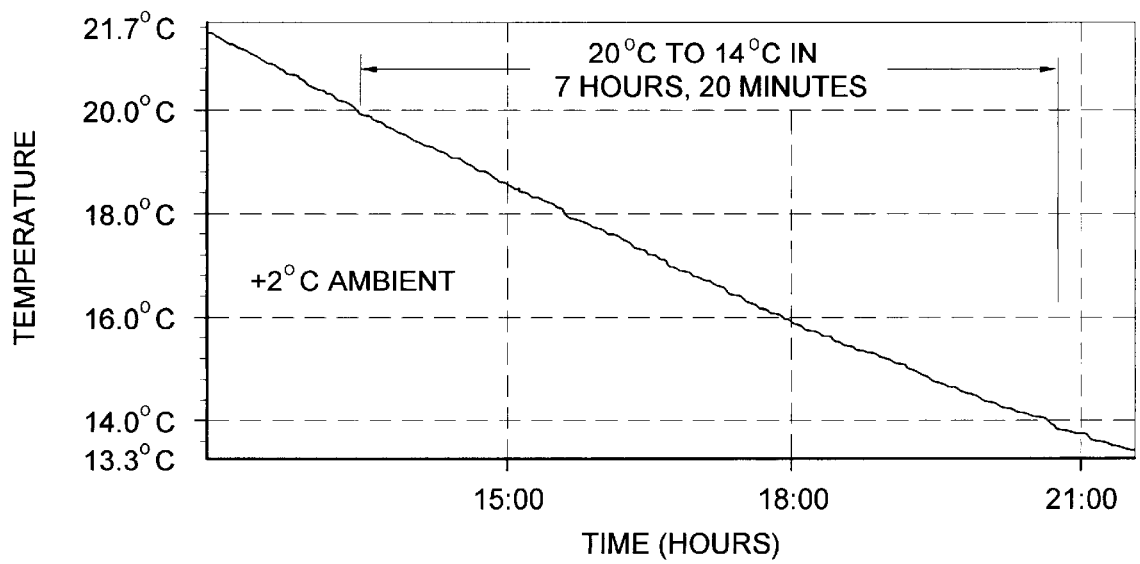
FIG. 12 is a graph showing cooling characteristic for ICE-PAK water based gel packs (ICE-PAK is a company in Montreal, Canada)

The comparative cooling curve of an equal weight of commercially available, water based gel packs is seen in FIG. 12. Gel packs used were made by ICE-PAK, they contained water with some gelling agent. The gel packs cooled from 20° C. to 14° C. in 7 hours, 20 minutes. The Red PCM cooled from 20° C. to 14° C. in 52 hours, 49 minutes under the same conditions. The Red PCM lasted 7.2 times longer than the same weight of gel packs.

Figure 13:
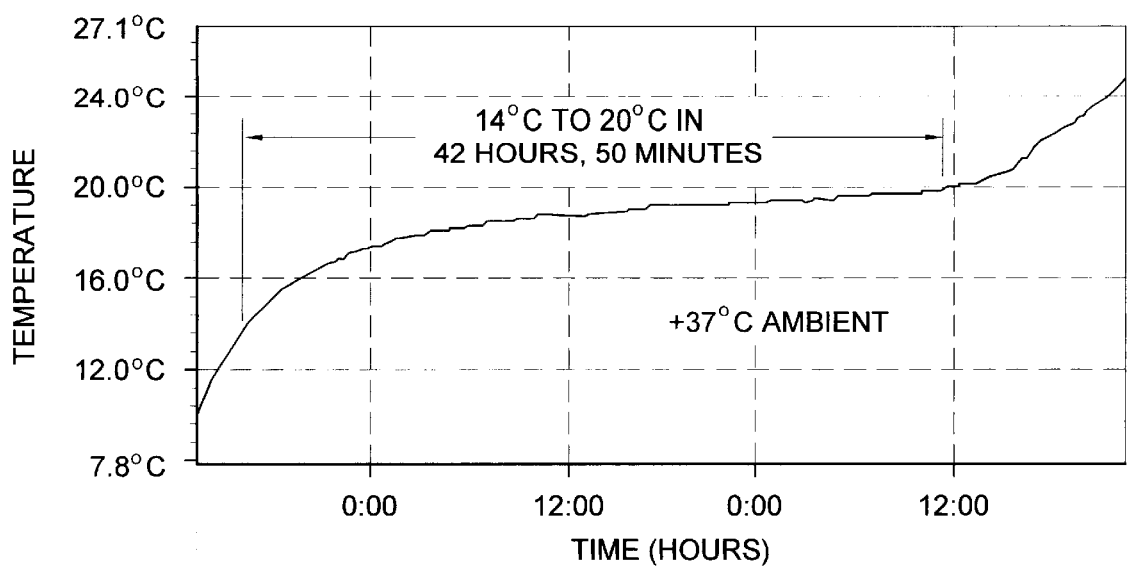
FIG. 13 is a graph showing warming and thaw characteristic for Red PCM.

FIG. 13 illustrates the characteristic of Red PCM as it changes from solid to liquid form. This characteristic simulates the performance of Red PCM in maintaining a 14° C. to 20° C. temperature range with a warm ambient temperature, analogous to ground shipping in summer conditions. One kilogram of solid Red PCM was placed inside an ISC E-28 box 38 and packaged as for the red PCM thaw test described above. This container was then placed inside a chamber at +37° C.

Figure 14:
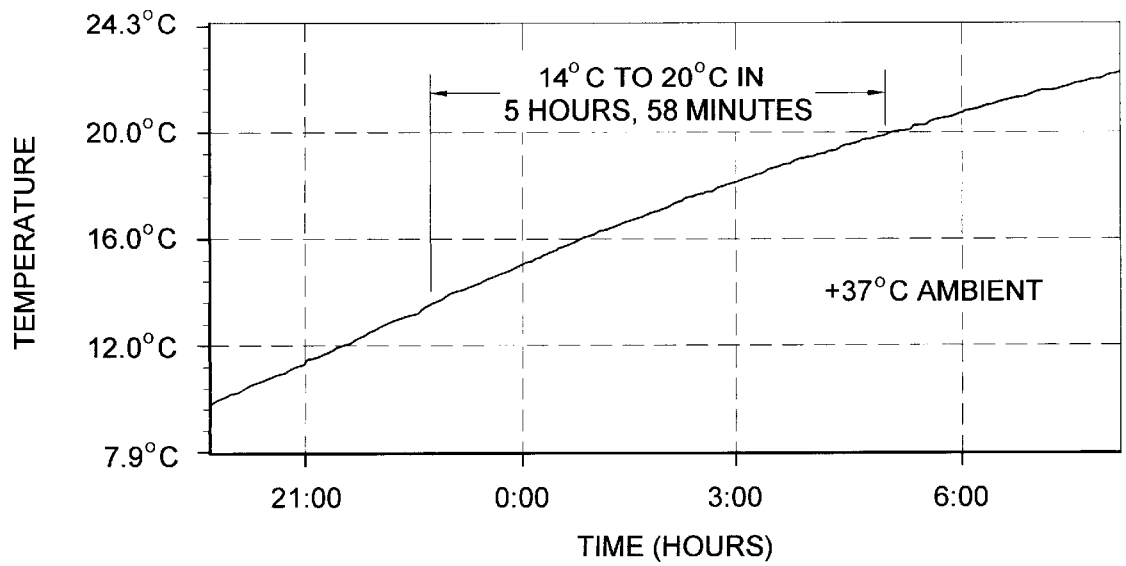
FIG. 14 is a graph showing warming characteristic for ICE-PAK water based gel packs.

The warming curve of an equal weight of water based gel packs, which were conditioned and packaged just as the Red PCM, are seen in FIG. 14. The gel packs remained between 14 to 20° C. for 5 hours and 58 minutes. The Red PCM remained between 14 and 20° C. for approximately 42 hours and 50 minutes under the same conditions. The Red PCM maintained 14 to 20° C. 7.1 times longer than the gel packs. Red PCM therefore has potential where product must be protected from temperatures above room temperature.

Red PCM was successfully used to maintain chocolate below 22° C. (72° F.) for 2 days. Product distribution costs therefore can be lowered by using a 2 day delivery instead of a one day delivery. The daily ambient temperatures were 12 hours at 31° C. (87° F.) and 12 hours at 18° C. (65° F.). The candy was packed in a 3 or 4 mil plastic bag and sealed with a twist tie. It was initially cooled to below 15° C. (60° F.). Red PCM was frozen in a freezer and one layer of the PCM was placed on each side the outside of the candy bag. The candy bag and PMC were placed in an expanded polystyrene container. The polystyrene R value was about 3.3., and the size was chosen so the candy and PCM fit closely inside. Any voids were filled with packing material.

Because Red PCM freezes at about 15° C., it can recharge at frequently encountered ambient temperatures, thereby extending the high temperature resistance of the packaging.

Another PCM, referred to as Blue PCM, comprises 94.7% butanediol, 5.3% water and talc nucleating agent. Similar to Red PCM, talc concentration is 0.01 to 0.05% or lower. Blue PCM is well suited to maintain product temperature between 2 and 8° C., or between 2 and 10° C.

Figure 15:
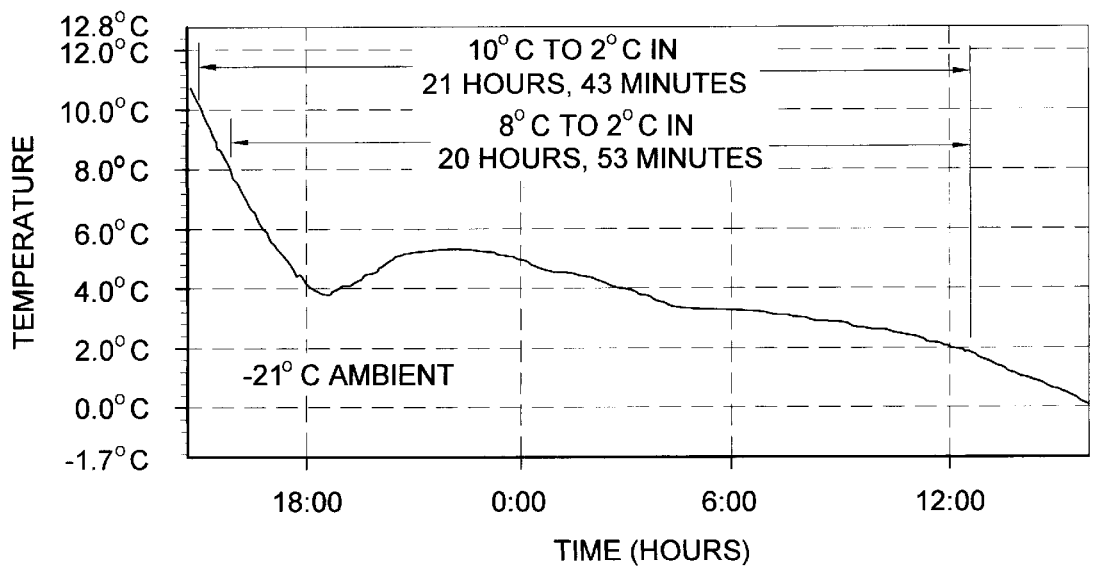
FIG. 15 is a graph showing cooling and freezing characteristic for Blue PCM, which comprises 94.3% butanediol, 5.7% water and about 0.01% talc.

FIG. 15 illustrates the characteristic of Blue PCM as it changes from liquid to solid form. This characteristic simulates the performance of Blue PCM in maintaining an 8° C. to 2° C. temperature range with a low ambient temperature, analogous to ground shipping a sample in winter conditions. A temperature probe was installed in 1.0 Kg of Blue PCM, packaged in a sheet of 'blisters' each containing approximately 12 grams of Blue PCM, in liquid form and placed inside an ISC E-28 box 38. The ISC-28 box 38 has the same specifications, and the packing of the Blue PCM and temperature probe was the same as for the Red PCM tests described above and shown in FIG. 11. The contents were installed in the box at room temperature prior to cooling so that they would be in a reproducible thermal state for the transition from 8° C. to 2° C. This box was then placed inside a freezer at −21° C.

Figure 16:
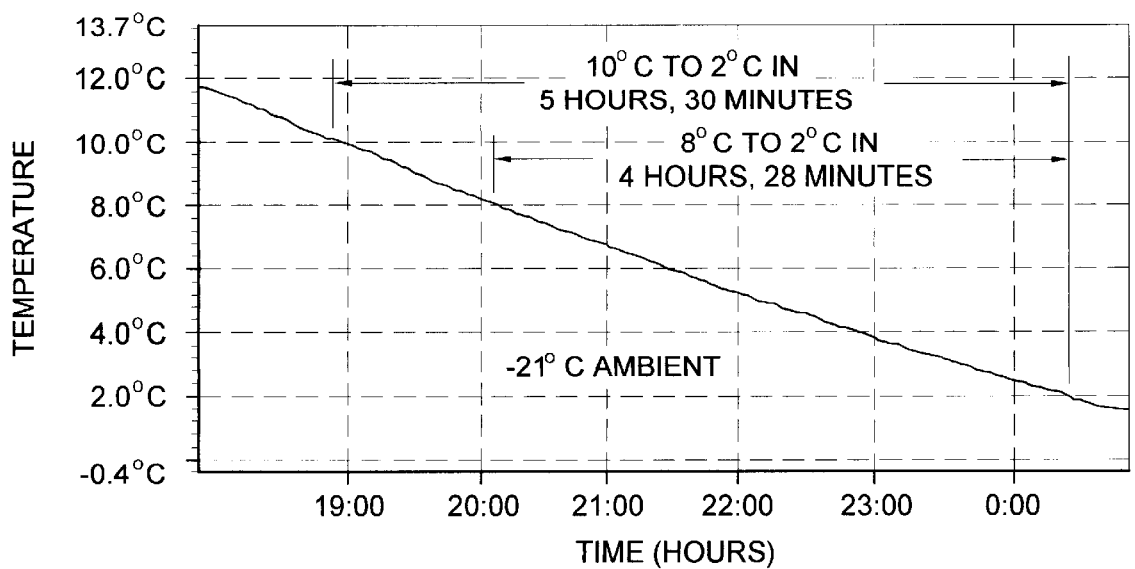
FIG. 16 is a graph showing cooling characteristic for ICE-PAK water based gel packs.

The comparative cooling curves for commercial water gel packs, which were conditioned and packaged as the Blue PCM in the above paragraph, are seen in FIG. 16. The gel packs remained between 8 to 2° C. for 4 hours and 28 minutes. The Blue PCM remained between 8 and 2° C. for 20 hours and 53 minutes under the same conditions, which is 4.6 times longer than the same weight of gel packs. Additionally, the rate of cooling of gel packs at 1° C. was 1.3° C. per hour. The rate of cooling for Blue PCM at that temperature was 0.5° C. per hour, 2.6 times slower than the gel packs. This is important, as product will not necessarily be discarded if its temperature falls fractionally below 2° C.

Figure 17:
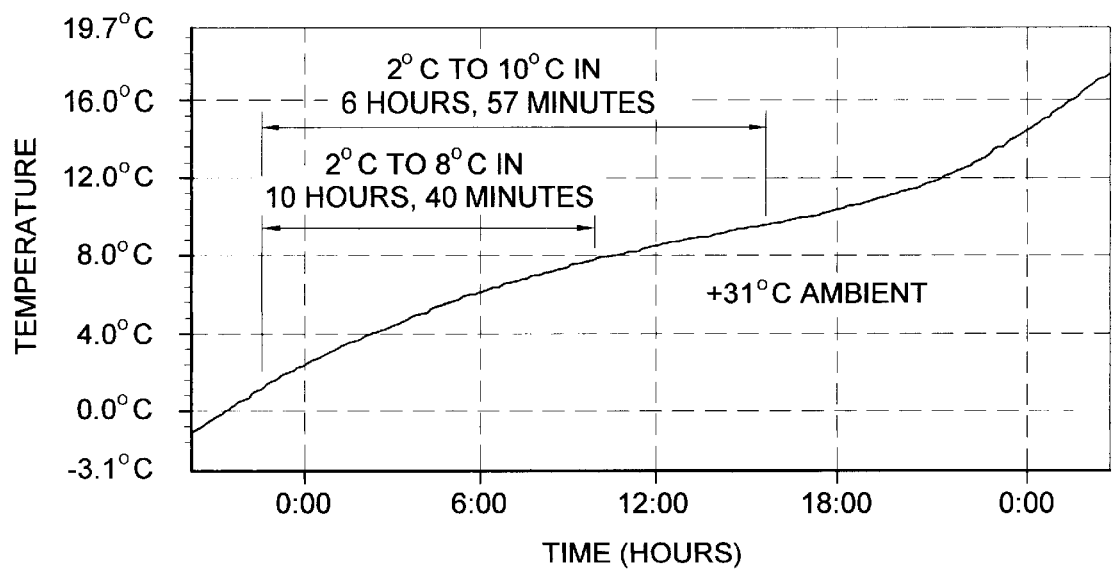
FIG. 17 is a graph showing warming and thawing characteristic for Blue PCM.

FIG. 17 illustrates the characteristic of Blue PCM as it changes from solid to liquid form. This characteristic simulates the performance of Blue PCM in maintaining a 8° C. to 2° C. temperature range with a warm ambient temperature, analogous to ground shipping a sample in summer. One kilogram of solid Blue PCM was packaged and placed in an ISC E-28 box, as for the cooling test described above. This container was then placed inside a chamber at +31° C. The Blue PCM maintained itself within the 8° C. to 2° C. temperature range for 10 hours and 40 minutes and between 10° C. and 2° C. for 16 hours and 57 minutes.

Figure 18:
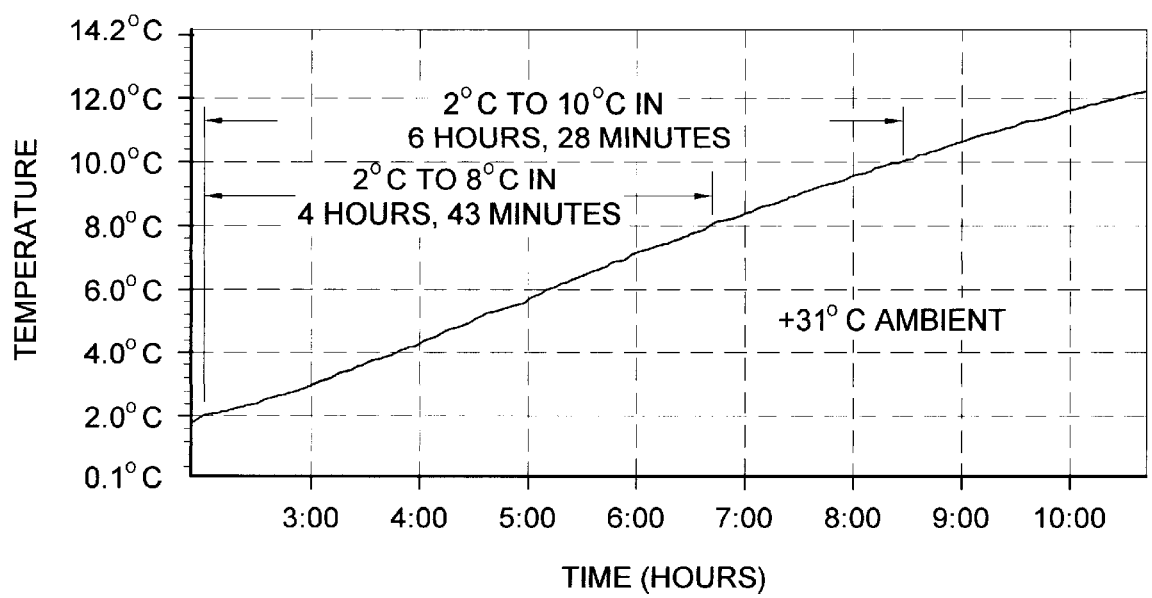
FIG. 18 is a graph showing warming characteristic for ICE-PAK water based gel packs.

FIG. 18 illustrates the warming characteristics of 1 Kg of gel packs under the same conditions as Blue PCM. The gel packs held 2 to 8° C. for 4 hours and 43 minutes and 2 to 10° C. for 6 hours and 28 minutes. The Blue PCM maintained 2 to 8° C. 2.3 times longer than gel packs and 2 to 10° C. 2.6 times longer than gel packs. The rate of temperature rise between 9 and 12° C. was 1.2° C. per hour for gel packs and 0.33° C. per hour for Blue PCM. The rate of temperature rise for Blue PCM is 3.6 times slower than that for gel packs in the temperature range of 9 to 12° C.

Blue PCM has been used in improved packaging for shipping blood. A significant advantage of this packaging becomes apparent when a package, prepared for summer conditions, is shipped by air and encounters −30° C. at high altitude. As Blue PCM changes phase above 0° C., it will also protect against such cold ambient excursions.

Figure 19:
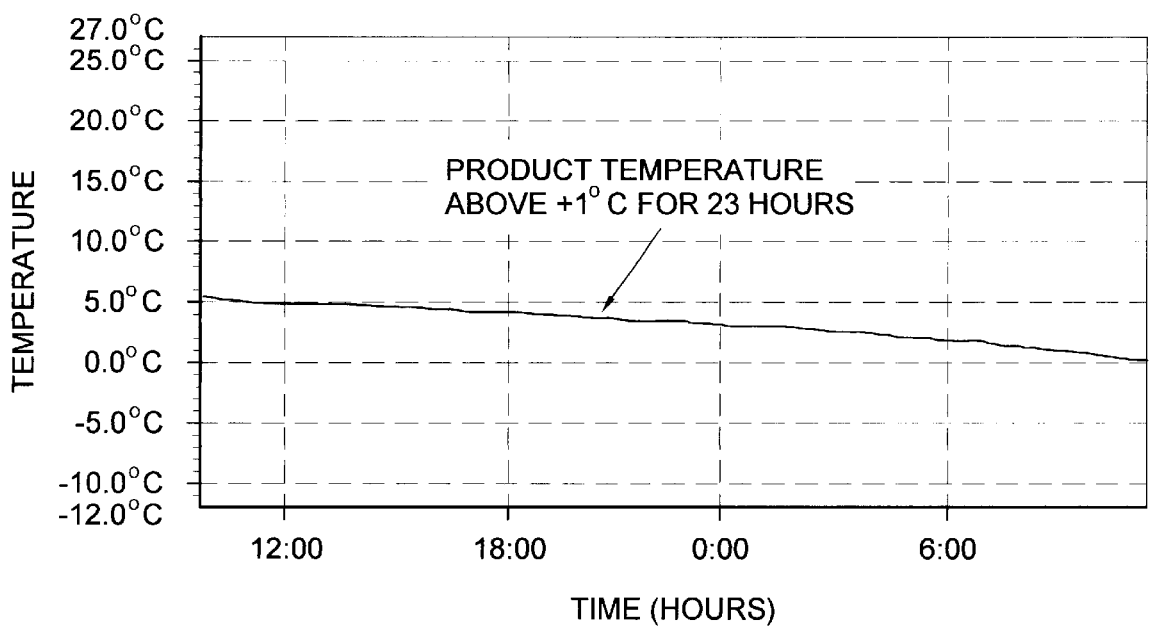
FIG. 19 is a graph showing product temperature history for a blood shipping package test in cold ambient.

The blood shipment packaging was tested in both hot and cold ambient temperatures. For the cold ambient temperature test, a blood agency insulated box was used. Its external dimensions were 15 ½"×12"×12 ½" high with an EPS wall thickness of 1 ½". It was packed as follows, from the bottom up:

1. Five layers of liquid blue phase change material (PCM) at +18° C. One layer of frozen blue PCM at −20° C. frozen in capsule blankets (The starting temperatures of the blue PCM were not critical as long as they are either in the liquid or frozen state as specified.)
2. Cardboard separator
3. 1 Kg "product" preconditioned at 5.2° C. in a plastic bag. Gel packs were used as they have a similar sensible heat to whole blood.
4. Cardboard separator
5. One layer of frozen blue PCM at −20° C.
6. Five layers of liquid phase blue PCM
7. Packing paper to fill the void on top The total amount of PCM amounted to 2.3 Kg (5.1 pounds). The packed box was placed in a freezer at −21° C. and the product and ambient temperatures were recorded. As shown in FIG. 19, the product temperature was maintained above 1.0° C. for 23 hours. This time was obtained from tabular data.

Figure 20:
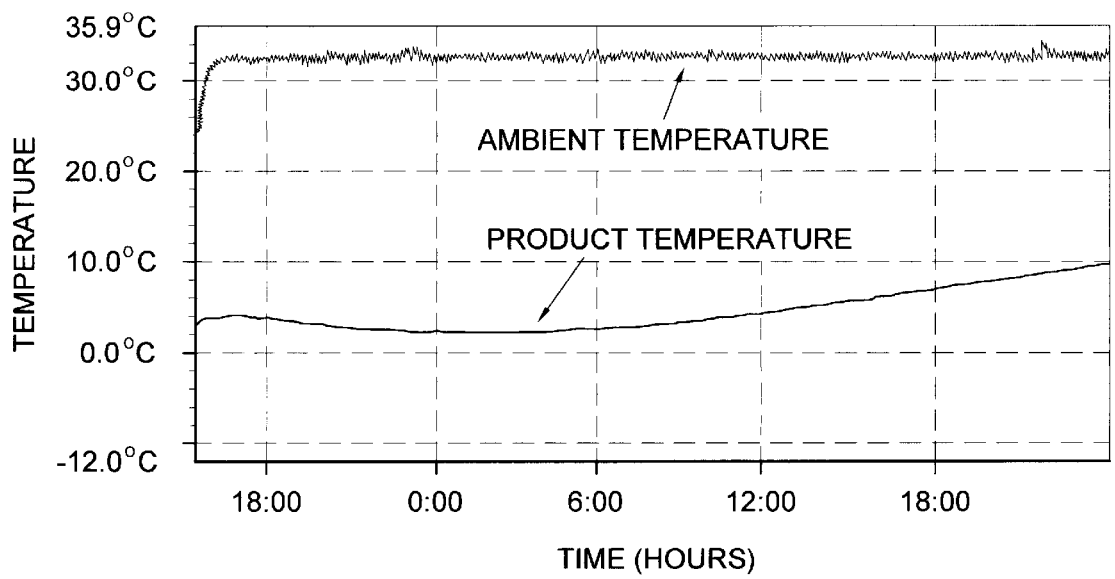
FIG. 20 is a graph showing product temperature history for a blood shipping package test in warm ambient.

For the hot ambient temperature test the box was packed as follows, from the bottom up:

1. Three layers of liquid blue PCM at +18° C. and three layers of frozen clear PCM at −20° C. interleaved. Clear PCM was Cryomat™, Cryomat™ being a commercially available PCM comprising 3% Polyethylene Glycol (8000 molecular weight) in water. The starting temperatures of the PCMs are not critical as long as they are either in the liquid or frozen state as specified.
2. Cardboard separator
3. 1 Kg "product" preconditioned at 3.3° C. in a plastic bag. Again gel packs were used.
4. Cardboard separator
5. Three layers of liquid blue phase change material (PCM) at +18° C. and three layers of frozen clear PCM at −20° C., interleaved
6. Packing paper to fill the void on top The total amount of PCM amounted to 2.4 Kg (5.3 pounds). The packed box was placed in a controlled temperature chamber at 32° C. and the product and ambient temperatures were recorded. The above packing scheme maintained the product temperature below 10° C. for 31 hours, as shown in FIG. 20. This time was obtained from tabular data.

Figure 21:
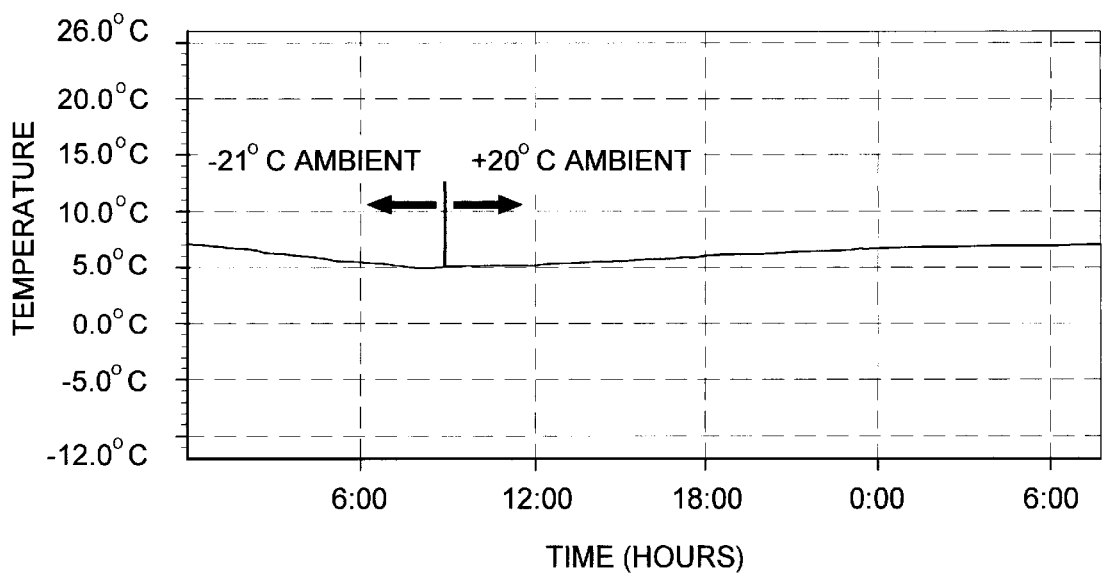
FIG. 21 is a graph showing product temperature history for a blood shipping package test in cold and hot ambient.

A shipping container using different solid and liquid PCMs kept product between +5° C. and +7° C. for 32 hours in ambient temperatures of −21° C. followed by +20° C. The packing was as shown in FIG. 4: the product compartment being between the PCM compartments. Outer container was ISC Inc. E-36 with 2" urethane foam walls. The dividers between the PCM and product compartments were 1" thick closed cell foam rubber. The liquid PCM comprised 3 lbs of 96% 1,4-butanediol, 4% distilled water, for which the phase change temperature was +11° C. The solid PCM was 2 lbs. Cryopak (primarily water ice), for which the phase change temperature was −0.5° C. The product was 4.5 lbs of 10% glycerol 90% distilled water, preconditioned at +8° C. The container was placed in an ambient temperature of −21° C. for about 9 hours, followed by an ambient temperature of 20° C. for 23 hours. Product temperature history is shown in FIG. 21.

Blue PCM would be a suitable choice of PCM for protecting chocolate temperature as described above, if the ambient temperature is cold. For both warm and cold ambient temperatures, both Blue and Red PCM should be used. Liquid Blue PCM is a good choice to be used with solid water ice to be used to keep product between 2° C. and 8° C., as discussed above. Blue PCM has the appropriate melting point.

Figure 22:
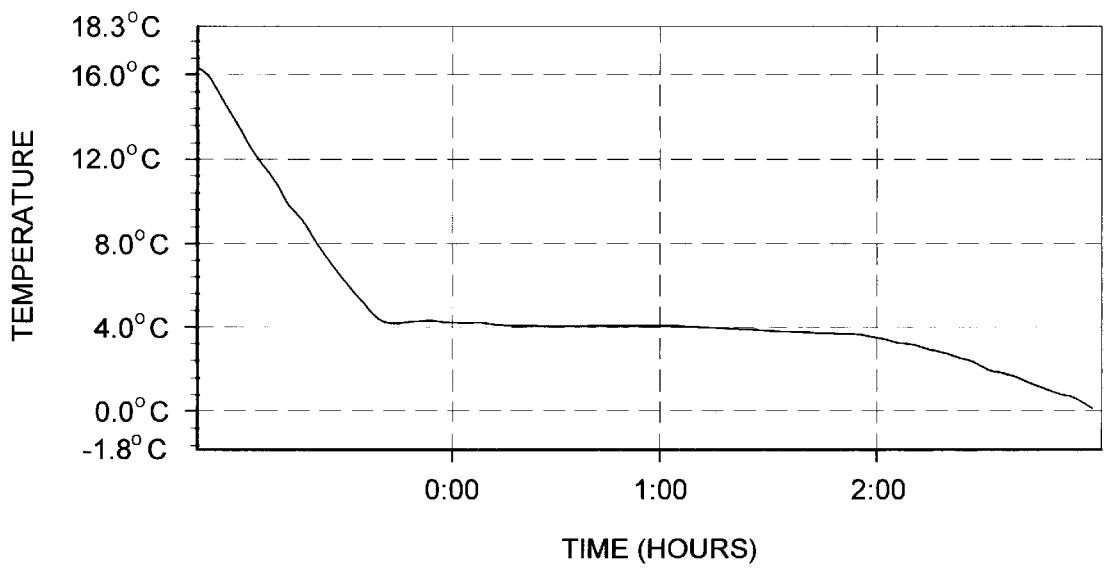
FIG. 22 is a graph showing cooling and freezing characteristic of a 94.5% 1,4-butanediol 5.5% water formulation with 0.05% talc.
Figure 23:
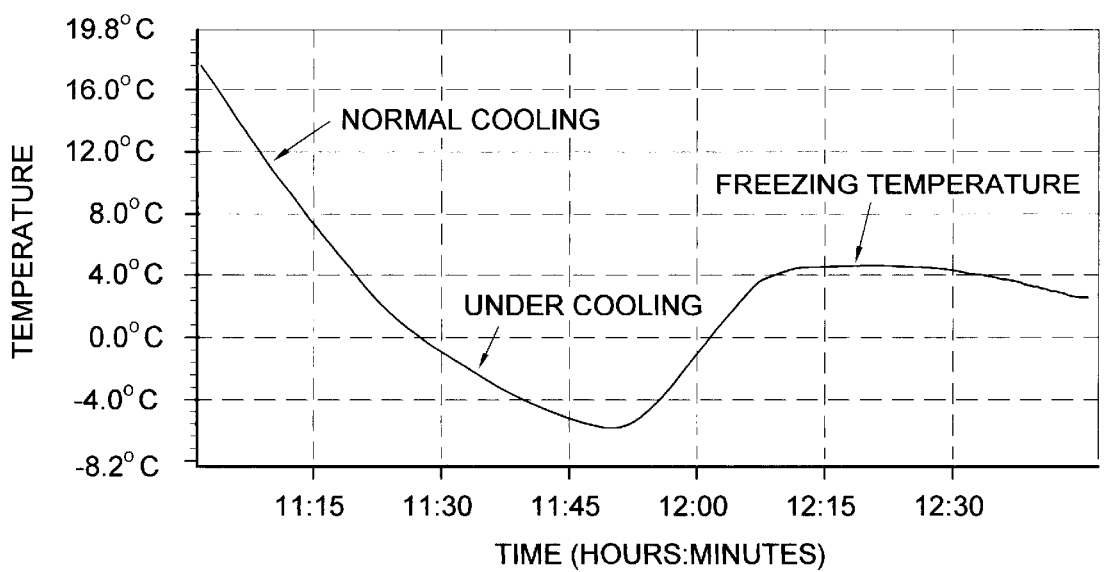
FIG. 23 is a graph showing cooling and freezing characteristic of a 94% 1,4 butanediol and 6% water formulation.
Figure 24:
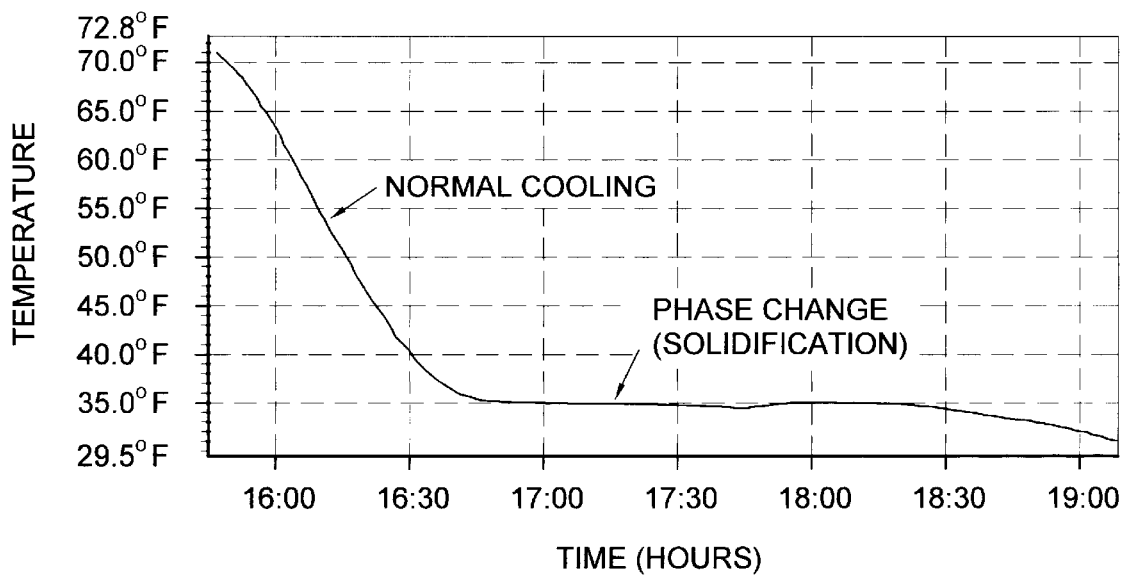
FIG. 24 is a graph showing cooling and freezing characteristic of a formulation which comprises 93.8% butanediol, 6.2% purified water, and 0.01% N660 Talc.
Figure 25:
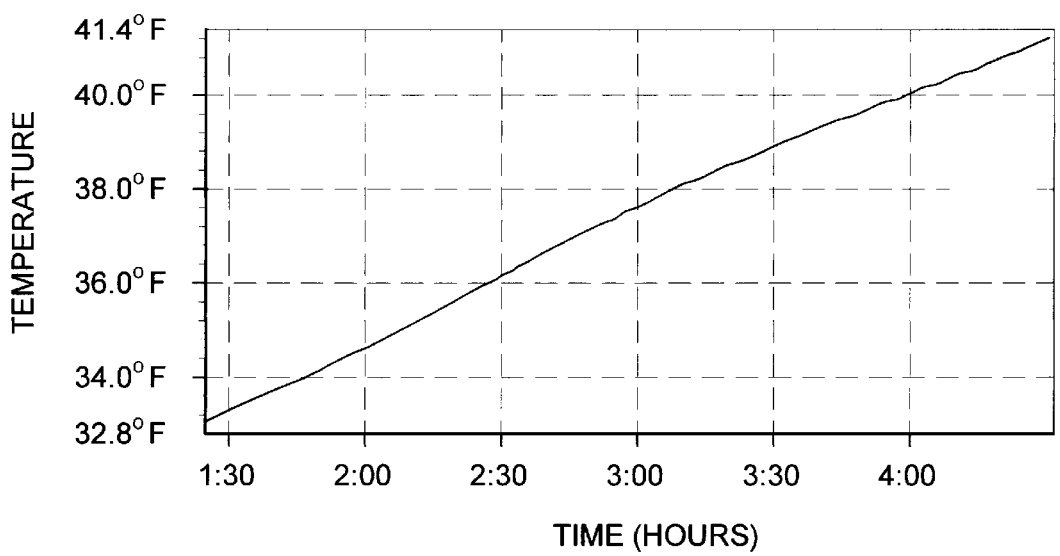
FIG. 25 is a graph showing thawing characteristic of the formulation of FIG. 24.

Another PCM comprising 50 ml of 94% 1,4-butanediol and 6% water super cools to below −6° C. when placed in a constant temperature freezer at approximately −20° C. Phase change crystallization occurs and brings the temperature of the mixture back up to its freezing point, +4° C. This PCM therefore would not be suitable for protecting materials from freezing at 0° C. A 94.5% 1,4-butanediol 5.5% water mixture with 0.05% talc as the nucleation promoter freezes at about as illustrated in FIG. 22, which shows no supercooling. Freezing of nearly the same formulation without the talc, 94% 1,4 butanediol and 6% water is illustrated in FIG. 23, which shows supercooling to −6° C. A similar composition, comprising 93.8% butanediol, 6.2% purified water, and 0.01% N660 Talc freezes at about 35° F., as illustrated in FIG. 24. FIG. 25 shows thawing of this composition. These particular butanediol/water/talc phase change materials are useful for freeze protection as well as locking temperatures in a 2 to 8° C. range, which is quite important for many biological and other materials. They clean up with water. They shrink slightly upon freezing, thereby avoiding the container breakage that would occur with water.

Figure 26:
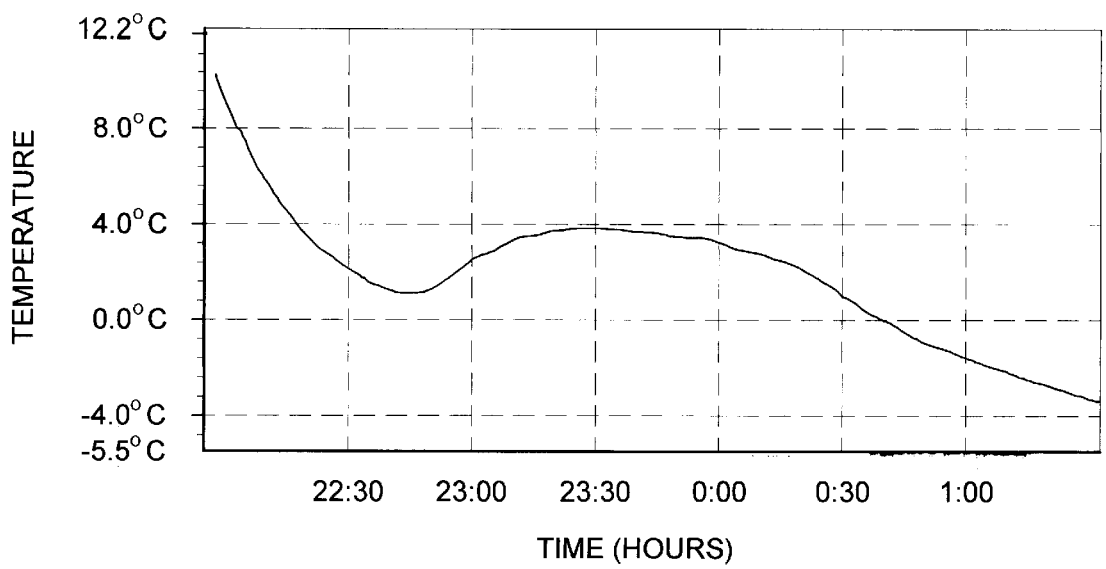
FIG. 26 is a graph showing cooling and freezing characteristic of a formulation comprising 5% water 95% 1,4 butanediol and 0.05% Barium Sulfate as a nucleating agent.

FIG. 26 shows that Barium Sulfate is not as efficient a nucleating agent as talc for these butanediol/water compounds. FIG. 26 shows the freezing characteristic of a mixture of 5% water, 95% 1,4-Butanediol, and 0.05% Barium Sulfate. FIG. 26 shows supercooling is greater than that of nearly the same composition using talc, shown in FIG. 22.

Another PCM, 1,6 hexanediol melts at +41° C. in its pure form and has a latent heat of fusion of 41.3 cal/g. Water can be added to alter the melting/freezing point and talc or other nucleation promoters can be added to prevent under cooling and provide a stable freeze/melting point. 1,6 hexanediol has the same NFPA (U.S. National Fire Protection Association) health, fire, and reactivity rating as 1,4 butanediol and glycerin. It can be used as an upper temperature limiter for temperature sensitive products. For example, the temperature in transport vehicles can exceed 60° C. which can compromise many different goods. This material in solid form, in conjunction with an insulated container, can provide a selected upper temperature limit of up to 41° C. Because of the latent heat of fusion employed at the selected temperature, this material can be several times more effective at temperature control than the same weight of water based systems (eg. gel packs). When the ambient temperature falls below the selected temperature, this phase change material will re-solidify or "recharge". The cooler ambient portions of the day can effectively recharge the system to withstand the hotter portions.

A 94.2% 1,6-hexanediol 5.8% water 0.05% talc mixture has a freezing point of +23° C., which is useful for keeping the temperature of blood platelets in the 20 to 24° C. range. Platelets rapidly and permanently lose their effectiveness with even small temperature excursions below 20° C. This is a significant problem for blood agencies that ship platelets to regional health facilities. This above formulation is over 5 times as effective by weight as the water based gel packs currently in use for temperature stabilization in this range. Shipments are often placed in bus cargo holds, in which the temperature range can be −20° C. to +40° C. or wider. A combination of this 1,6 hexanediol PCM and Red PCM would provide both over warming and under cooling protection for platelets. Using the "sheet" packaging method described above, sheets of interleaved liquid hexanediol formulation and solid form 1,4 butanediol formulation will provide a 20 to 24° C. thermal bracket.

Pure 1,3 propanediol and 1,5 pentanediol melt at −16° C. and −27° C. respectively. Water can be added to alter the melting/freezing point and talc or other nucleation promoters added to prevent under cooling and provide a stable freeze/melting point. 1,5 pentanediol has the same NFPA (U.S. National Fire Protection Association) health, fire, and reactivity rating as 1,4 butanediol and glycerin. Both can be used as dry ice substitutes.

The polyethylene glycols (200, 300, etc.) are mixtures of different but similar sizes of molecules. They are available in molecular weights ranging from 200 to 20,000, with corresponding melting and freezing points ranging between −60 and +60° C. The latent heats of fusion are generally in the 20's of cal/g. The addition of water and a nucleation promoter such as talc provides adjustable phase change points with minimal under cooling. The latent heat of fusion of PEG is significantly less than the diols listed above and the melt and freeze characteristics are more poorly defined. The main advantage of PEG is that it can be obtained in "food grade" specifications, relatively economically.

Figure 27:
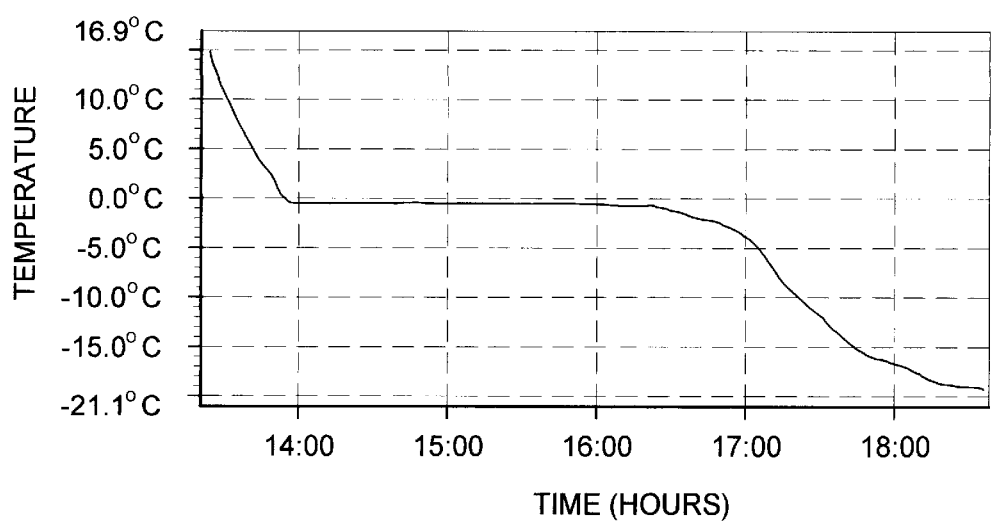
FIG. 27 is a graph showing cooling and freezing characteristic of a formulation which comprises comprises 98% purified water, 2% Sentry Grade Polyethylene Glycol 400 by Union Carbide and 0.01% Altalc 500V USP by Luzenac America Inc. as a nucleating agent.
Figure 28:
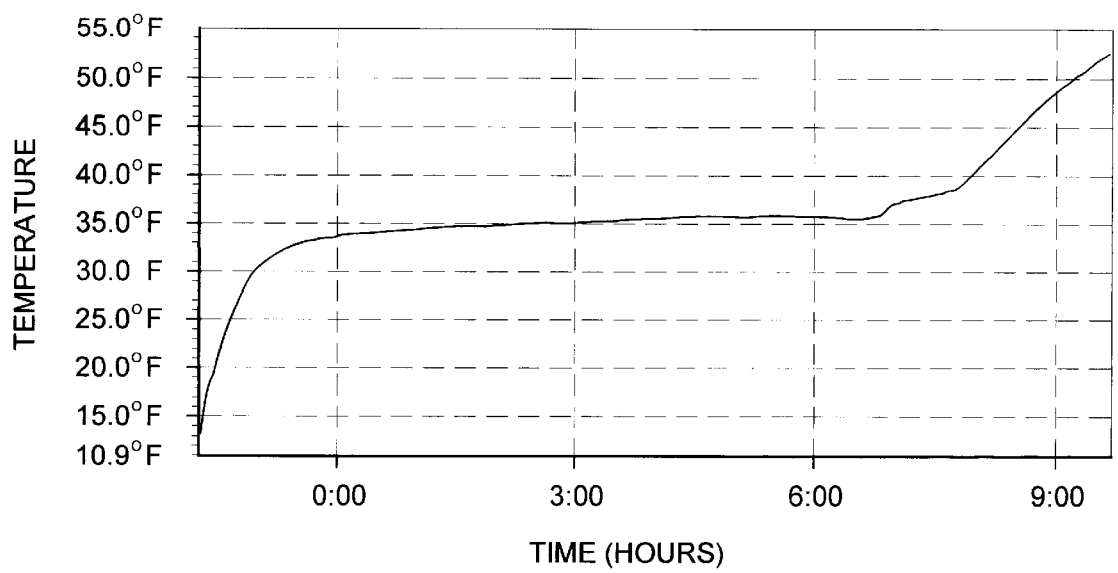
FIG. 28 is a graph showing warming and thawing characteristic of the formulation of FIG. 27.
Figure 29:
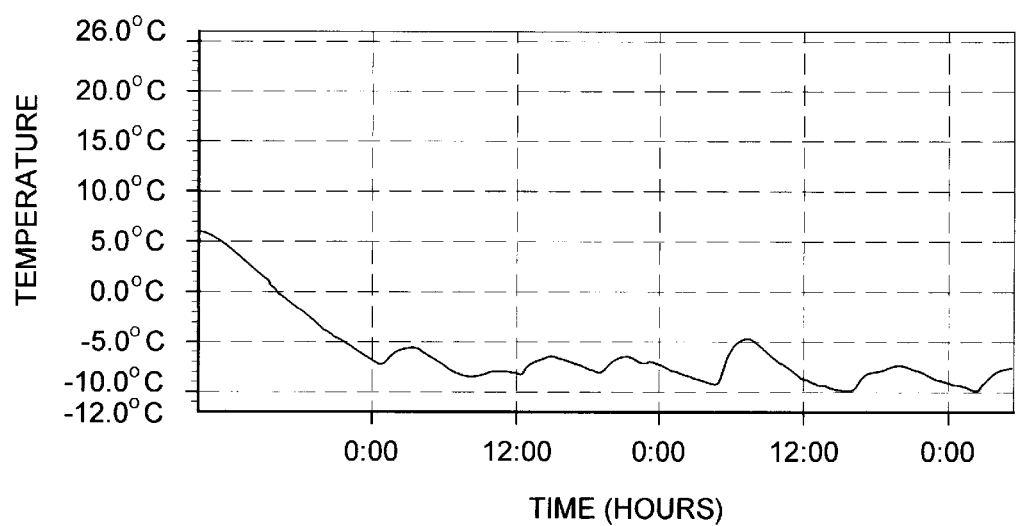
FIG. 29 is a graph showing cooling and freezing characteristic of Cryomat™, which is a commercially available product comprising 3% Polyethylene Glycol and 97% water.

A PCM may comprise 98% purified water, 2% Sentry Grade Polyethylene Glycol 400 by Union Carbide and 0.01% Altalc 500V USP by Luzenac America Inc. as a nucleating agent. It freezes at about −1° C. as shown in FIG. 27. FIG. 28 shows its thaw characteristic. This formulation meets United States FDA standards for use with food products, because of the Sentry Grade Polyethylene Glycol 400. Using Sentry Grade also results in a more consistent phase change characteristics. Lower grade Polyethylene Glycols are actually mixes of various molecular weight Polyethylene Glycols. This formulation's solid phase is pliable, making it suitable for packing blankets and reducing PCM container breakage, and has better supercooling behavior than Cryomat, a commercially available coolant comprising 3% Polyethylene Glycol in water, packed in a capsule-style blanket. FIG. 29 shows the cooling behaviour of 1 Kg. of Cryomat in a −21° C. freezer. The low temperature cycling is due to supercooling of individual capsules. Not only could this supercooling behaviour cause product temperature to become too low, it also causes Cryomat to take a long time to completely freeze ready for use. Alternatively, Cryomat's supercooling can be virtually eliminated by adding 0.01% talc.

A nucleating agent is important in diols and glycols as less than 1% water in these materials can significantly affect the amount of super cooling. These percentages of water may exist as impurities in the original product or may be obtained from exposure to room air as these materials are hygroscopic-they absorb water from the atmosphere. Cellulose based agents can be used to thicken or gel the propanediol, pentanediol and polyethylene glycol PCMs.

Another PCM comprising 90% water, 10% glycerol and 0.05% talc solution begins freezing at approximately −5° C. and undergoes phase change in the thawing mode between −7 and −2° C., as shown in FIG. 6. It therefore can keep product below 0° C. It freezes easily in the typical domestic freezer temperature range of −21° C. The talc or other nucleation promoter is essential to prevent super cooling which makes this material easier to freeze and also provides a predictable freezing temperature. Latent heat of fusion is estimated in the range of 70 cal/g. A 20% glycerol with the balance water and a small amount of talc as a nucleating agent provides a material that changes phase between −5 and −14° C. that still has a relatively high latent heat of fusion. These formulations are quite inexpensive and can be made to food grade specifications.

The PCMs can be used in conjunction with commercially available instant hot packs or cold packs. These hot and cold packs produce transient heat generation and absorbtion, but their temperatures are not sufficiently controlled that they could alone maintain the proper product temperature. The PCM's maintain this temperature by absorbing excess transient heat from the hot packs, or providing extra transient heat to the cold packs.

The PCM's can be used for other applications besides product shipping, mainly because they can efficiently store and release heat at selected temperatures.

PCM's can be used in buildings for storing and releasing heat at predetermined times. PCMs could be incorporated into building materials or located remotely in heat exchange reservoirs. This will reduce the size requirement of heating and chilling equipment, and allow it to operate more efficiently.

Encapsulated PCM's could be used in bridge decks and roadways subject to frequent icing. The PCM for this application has over 20 times more thermal energy storage capacity by weight than concrete. Solar radiation, even on cool days, could recharge (melt) the PCM. This PCM shrinks upon freezing and will not jeopardize the integrity of structures.

PCM's can be used to store "cold" in solar powered refrigerators. This is valuable where utilities do not exist. They can also be used in refrigerators and freezers to provide additional thermal capacity without larger mechanical cooling systems. This could be particularly useful in large scale systems with periodic personnel or vehicular traffic.

PCM's can be used in many applications where diurnal temperature variations must be limited. For example they can be used in outdoor temperature sensitive equipment installations where passive temperature control is desirable.

When the phase change formulation is used in a container for example as shown in FIG. 1, the phase change formulation packaging, for example the envelope shown in FIG. 5, should preferably extend completely across the interior of the chamber so that it has the same areal extent as the insulating plug 12.

Immaterial modifications may be made to the invention described here without departing from the essence of the invention.

The embodiments of the invention in which an exclusive property or privilege is claimed are defined as follows:

1. A phase change formulation comprising 1–99.5% by weight polyol, wherein the polyol is selected from the group consisting of 1,4 butanediol and 1,6 hexanediol, 0.5–99% by weight water, and an amount of nucleating agent sufficient to reduce super cooling of the phase change formulation.

2. The phase change formulation of claim 1 in which the nucleating agent is selected from the group consisting of talc and an alkaline earth metal salt.

3. The phase change formulation of claim 2 in which the nucleating agent is talc present in an amount of more than 100 parts per million.

4. The phase change formulation of claim 1 further comprising thickening agent in an amount sufficient to cause gelling of the phase change formulation.

5. The phase change formulation of claim 4 in which the thickening agent is a kaolin clay present in an amount of more than 0.5% by volume.

6. The phase change formulation of claim 1 in which the polyol is 1,4 butanediol.

7. The phase change formulation of claim 1 in which the polyol is 1,6 hexanediol.

8. A phase change formulation comprising 1–99.5% by weight polyol, wherein the polyol is selected from the group consisting of 1,4 butanediol, 1,6 hexanediol and polyethylene glycol, 0.5–99% by weight water, and an amount of talc sufficient to reduce super cooling of the phase change formulation, the talc being present in an amount of more than 100 parts per million.

9. The phase change formulation of claim 8 further comprising thickening agent in an amount sufficient to cause gelling of the phase change formulation.

10. The phase change formulation of claim 9 in which the thickening agent is a kaolin clay present in an amount of more than 0.5% by volume.

11. The phase change formulation of claim 8 which the polyol is 1,4 butanediol.

12. The phase change formulation of claim 8 in which the polyol is 1,6 hexanediol.

13. The phase change formulation of claim 8 in which the polyol is polyethylene glycol.

14. A phase change formulation comprising 1–99.5% by weight polyol, wherein the polyol is selected from the group consisting of 1,4 butanediol, 1,6 hexanediol and polyethylene glycol, 0.5–99% by weight water, an amount of nucleating agent sufficient to reduce super cooling of the phase change formulation and thickening agent in an amount sufficient to cause gelling of the phase change formulation.

15. The phase change formulation of claim 14 in which the nucleating agent is selected from the group consisting of talc and an alkaline earth metal salt.

16. The phase change formulation of claim 14 in which the nucleating agent is talc present in an amount of more than 100 parts per million.

17. The phase change formulation of claim 14 in which the thickening agent is a kaolin clay present in an amount of more than 0.5% by volume.

18. The phase change formulation of claim 14 in which the polyol is 1,4 butanediol.

19. The phase change formulation of claim 14 in which the polyol is 1,6 hexanediol.

20. The phase change formulation of claim 14 in which the polyol is polyethylene glycol.

* * * * *

UNITED STATES PATENT AND TRADEMARK OFFICE
CERTIFICATE OF CORRECTION

PATENT NO.    : 6,482,332 B1
DATED         : November 19, 2002
INVENTOR(S)   : T.J. Malach It is certified that error appears in the above-identified patent and that said Letters Patent is hereby corrected as shown below:

<u>Title page,</u>
Item [56], References Cited, FOREIGN PATENT DOCUMENTS, insert in appropriate order:  -- JP    59-140283    8/1994 --

<u>Column 16,</u>
Line 37, "8 which" should read -- 8 in which --

Signed and Sealed this

Third Day of June, 2003

JAMES E. ROGAN
*Director of the United States Patent and Trademark Office*